(12) United States Patent
Hanzawa et al.

(10) Patent No.: US 8,743,186 B2
(45) Date of Patent: Jun. 3, 2014

(54) FOCAL DEPTH EXPANSION DEVICE

(71) Applicant: Olympus Medical Systems Corp., Tokyo (JP)

(72) Inventors: Toyoharu Hanzawa, Tokyo (JP); Yoshiharu Takasugi, Saitama (JP); Makoto Tomioka, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/930,247

(22) Filed: Jun. 28, 2013

(65) Prior Publication Data
US 2013/0335534 A1    Dec. 19, 2013

Related U.S. Application Data

(63) Continuation of application No. PCT/JP2012/078730, filed on Nov. 6, 2012.

(30) Foreign Application Priority Data

Dec. 16, 2011  (JP) ................................. 2011-276369

(51) Int. Cl.
*H04N 13/02*    (2006.01)
*G02B 21/36*    (2006.01)

(52) U.S. Cl.
USPC .............................. 348/50; 359/363; 382/255

(58) Field of Classification Search
None
See application file for complete search history.

(56) References Cited

U.S. PATENT DOCUMENTS

| 5,148,502 | A | * | 9/1992 | Tsujiuchi et al. ............. 382/255 |
| 5,606,363 | A | | 2/1997 | Songer |
| 5,671,007 | A | | 9/1997 | Songer |
| 5,805,205 | A | | 9/1998 | Songer |
| 7,160,249 | B2 | * | 1/2007 | Hasegawa ..................... 600/167 |
| 2008/0239088 | A1 | | 10/2008 | Yamashita |

FOREIGN PATENT DOCUMENTS

| JP | 62-115409 | 5/1987 |
| JP | 08-511401 | 11/1996 |
| JP | 11-032251 | 2/1999 |
| JP | 2001-344599 | 12/2001 |
| JP | 2002-247439 | 8/2002 |
| JP | 2004-350070 | 12/2004 |

(Continued)

OTHER PUBLICATIONS

International Search Report, issued in corresponding International Application No. PCT/JP2012/078730.

*Primary Examiner* — Behrooz Senfi
*Assistant Examiner* — Mohammed Jebari
(74) *Attorney, Agent, or Firm* — Kenyon & Kenyon LLP

(57) ABSTRACT

A depth expansion apparatus includes an image-pickup-optical-system and an image-pickup-device (hereinafter, IPS) configured to form and pick up images A and B in different focus positions, and a depth-expanded-image forming section configured to generate, based on the images A and B, a depth-expanded-image that maintains a relation between a distance from an object point to the image-pickup-optical-system and luminance. When an image side NA of the image A is represented as NA', a resolution determined by the IPS, as R, an optical path interval between image forming surfaces for the images A and B, as d, NA of an image at a near photographing distance among the images A and B, as NAn, and NA of an image at a far photographing distance among the images A and B, as NAf, the IPS satisfy the following conditional expressions (1) and (2):

$$R \times NA'/2 \leq d \quad (1)$$

$$0.05 \leq (NAf/NAn)^2 \leq 0.9 \quad (2).$$

13 Claims, 16 Drawing Sheets

(56) References Cited

FOREIGN PATENT DOCUMENTS

| | | |
|---|---|---|
| JP | 2005-049646 | 2/2005 |
| JP | 2005-189426 | 7/2005 |
| JP | 2006-208407 | 8/2006 |
| JP | 2008-244982 | 10/2008 |
| WO | 95/026612 | 10/1995 |

* cited by examiner

FOCAL DEPTH EXPANSION DEVICE

CROSS REFERENCE TO RELATED APPLICATION

This application is a continuation application of PCT/JP2012/078730 filed on Nov. 6, 2012 and claims benefit of Japanese Application No. 2011-276369 filed in Japan on Dec. 16, 2011, the entire contents of which are incorporated herein by this reference.

BACKGROUND OF THE INVENTION

1. Field of the Invention

The present invention relates to a depth expansion apparatus that combines a plurality of images in different focal positions to expand a depth of focus.

2. Description of the Related Art

To increase a depth of field of an observation system, in general, an aperture diaphragm is restricted (an F value is increased).

There has also been a proposal to configure an observation optical system to include a focus function and enable the observation optical system to focus on a wide range of the depth of field.

On the other hand, various techniques have been proposed for combining a plurality of images in different focal positions to expand a depth of focus.

For example, Japanese Patent Application Laid-Open Publication No. 11-32251 describes a technique for acquiring a plurality of images in different focal positions using a bifocal optical system including birefringent crystal, comparing and selecting luminances of respective pixels of the images in the different focal positions to recombine the images, and obtaining an image with a large depth of focus. The synthesis technique for a depth expanded image described in the publication is a technique for comparing luminances and selecting a pixel value of any one of the plurality of images on the basis of a comparison result.

Japanese Patent Application Laid-Open Publication No. 2001-344599 describes a technique for, before combining a plurality of images in different focal positions, making luminance levels of the respective images uniform and reducing noise.

Further, Japanese Patent Application Laid-Open Publication No. 2004-350070 describes an image processing apparatus that includes a plurality of image pickup devices for photographing images formed by a single photographing optical system and obtains an image formed by combining a plurality of image data photographed by the plurality of image pickup devices. The image processing apparatus includes controlling means for controlling, according to an operation condition of the photographing optical system, positions of the respective image pickup devices to satisfy a condition that depth of field ranges formed by the respective image pickup devices are adjacent to or slightly overlap one another.

Note that Japanese Patent Application Laid-Open Publication No. 8-241396 describes a technique for acquiring, on the basis of the principle that an image cumulatively added up and inputted while a focusing surface is moved in an optical axis direction is a convolution of a response function obtained by projecting a point spread function (PSF) in the optical axis direction and a parallel projected image of an object image, a plurality of images while moving the focusing surface in the optical axis direction and generating, on the basis of the plurality of images corresponding to different focusing surfaces, a plane projected image in a predetermined angle direction along the inside of a fault plane parallel to the optical axis.

Japanese Patent Application Laid-Open Publication No. 2005-49646 and Japanese Patent Application Laid-Open Publication No. 2006-208407 describe an improved stereoscopic display technique of a DFD type (depth-fused 3D) apparatus.

A technique generally used as a method of combining a plurality of images in different focal positions to generate a depth expanded image explained above is a technique for slicing out and combining images within depth.

The technique for slicing out and combining images within depth is explained with reference to FIGS. 1 to 3. FIG. 1 is a diagram for explaining a difference in an image forming position corresponding to an object distance. FIG. 2 is a chart showing a state of a luminance change corresponding to an object distance at the time when two images in different focal positions are sliced out and combined according to the object distance. FIG. 3 is a chart showing a state of a luminance change of a point light source corresponding to a change in an object distance at the time when a distance D0 is set as a focusing position.

A far distance image IMGf and a near distance image IMGn are formed in different positions from an object OBJf at a far distance and an object OBJn at a near distance even if the same image pickup optical system LS is used. In the far distance image IMGf, the far distance object OBJf is a focused image but the near distance object OBJn is a blurred image. Conversely, in the near distance image IMGn, the far distance object OBJf is a blurred image but the near distance object OBJn is a focused image.

Therefore, the far distance object OBJf focused in the far distance image IMGf and the near distance object OBJn focused in the near distance image IMGn are respectively extracted and combined as one image, whereby it is possible to obtain a depth expanded image focused on both of the far distance object OBJf and the near distance object OBJn.

More specifically, as shown in FIG. 2, a focused object distance of the near distance image IMGn is represented as D1 and a focused object distance of the far distance image IMGf is represented as D2 (D2>D1), with a boundary set in an object distance D3 in a middle of D1 and D2, an object present at a nearer distance than D3 is closer to a focus in the near distance image IMGn and an object present at a farther distance than D3 is closer to a focus in the far distance image IMGf. Therefore, in an image, an image portion is extracted from the near distance image IMGn concerning the object at the nearer distance than the distance D3 and an image portion is extracted from the far distance image IMGf concerning the object at the farther distance than the distance D3 and the image portions are combined, whereby a more focused image as a whole is obtained.

Incidentally, for easy understanding, it is assumed that a point light source is imaged. As shown in FIG. 3, a highest luminance value is obtained when the point light source is in a focusing position at the distance D0 and, since magnitude of a blur expands as the point light source moves further away from the focusing position (on any one of the near distance side and the far distance side), the luminance value obtained in the same pixel position falls. The luminance change shown in FIG. 3 is a natural luminance change corresponding to an object distance.

SUMMARY OF THE INVENTION

A depth expansion apparatus according to an aspect of the present invention is a depth expansion apparatus that can generate or display an image with an expanded depth of focus on the basis of a plurality of images in different focus positions, the depth expansion apparatus including: an image pickup optical system and an image pickup device configured to form and pick up a reference image (hereinafter referred to as image A) and an image in a focus position different from a focus position of the image A (hereinafter referred to as image B); and a depth-expanded-image forming section configured to generate or display, on the basis of a luminance change for each of corresponding pixels in the image A and the image B, a depth expanded image that maintains a relation between a distance from an object point to the image pickup optical system and luminance. When an image side NA of the image A is represented as NA', a lower one of resolution determined by the image pickup optical system and resolution determined by the image pickup device is represented as R, an optical path interval between a surface on which the image A is formed and a surface on which the image B is formed is represented as d, NA of an image at a near photographing distance among the image A and the image B is represented as NAn, and NA of an image at a far photographing distance among the image A and the image B is represented as NAf, the image pickup optical system and the image pickup device are configured to satisfy the following conditional expressions (1) and (2):

$$R \times NA'/2 \leq d \qquad (1)$$

$$0.05 \leq (NAf/NAn)^2 \leq 0.9 \qquad (2)$$

DETAILED DESCRIPTION OF THE PREFERRED EMBODIMENTS

Figure 4:
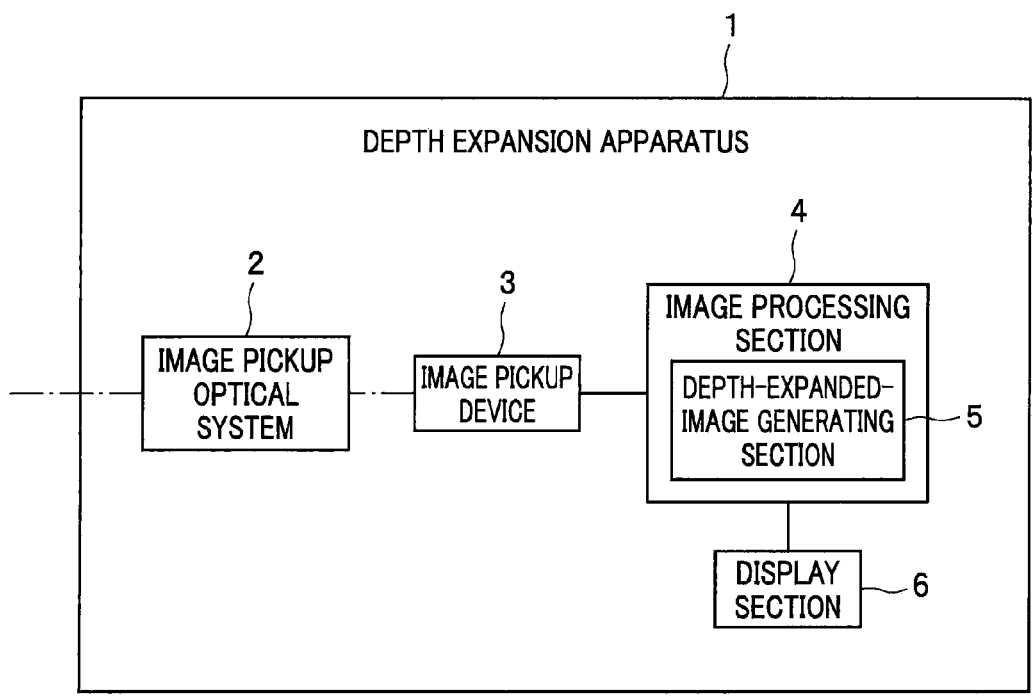
FIG. 4 is a block diagram showing a configuration of a depth expansion apparatus in a first embodiment of the present invention.

Embodiments of the present invention are explained below with reference to the drawings.
[First Embodiment]
FIGS. 4 to 16 show a first embodiment of the present invention. FIG. 4 is a block diagram showing a configuration of a depth expansion apparatus.

As shown in FIG. 4, a depth expansion apparatus 1 in the present embodiment generates, on the basis of a plurality of images in different focus positions, an image with an expanded depth of focus. The depth expansion apparatus 1 includes an image pickup optical system 2 and an image pickup device 3 configured to form and pick up a reference image (hereinafter referred to as image A) and an image in a focus position different from a focus position of the image A (hereinafter referred to as image B).

Figure 5:
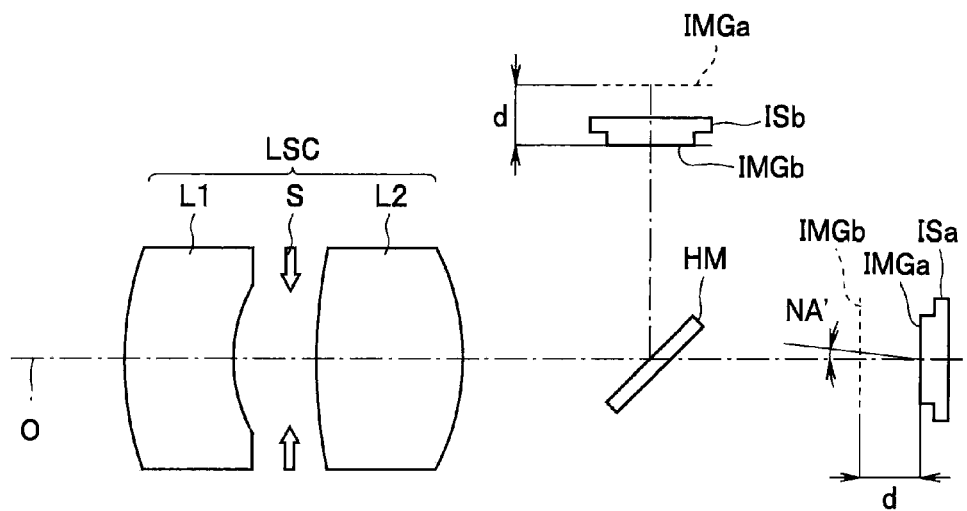
FIG. 5 is a diagram showing an example of a configuration of an image pickup optical system and an image pickup device of the depth expansion apparatus in the first embodiment.

FIG. 5 is a diagram showing an example of a configuration of the image pickup optical system 2 and an image pickup device 3 of the depth expansion apparatus 1.

In the example shown in FIG. 5, the image pickup optical system 2 includes a common optical system LSC and a half mirror HM, which is a splitting optical device.

The common optical system LSC is configured as, for example, an objective optical system, a fixed focus of which is a wide angle. The common optical system LSC includes a first group lens L1 having negative power, an aperture diaphragm S, and a second group lens L2 having positive power. The first group lens L1 mainly performs action for leading a light beam having a wide angle of view to the aperture diaphragm S. The second group lens L2 mainly performs image forming action. The common optical system LSC is configured as a telecentric optical system (more limitedly, an image side telecentric optical system).

The half mirror HM is disposed above and behind an optical axis 0 of the common optical system LSC and simultaneously performs light transmitting action and light reflecting action to thereby split light made incident from the common optical system LSC into two and emit the light in spatially different directions. Note that the half mirror HM is used as the splitting optical device. However, as explained below, a prism optical system may be used or other splitting optical device may be used.

Figure 1:
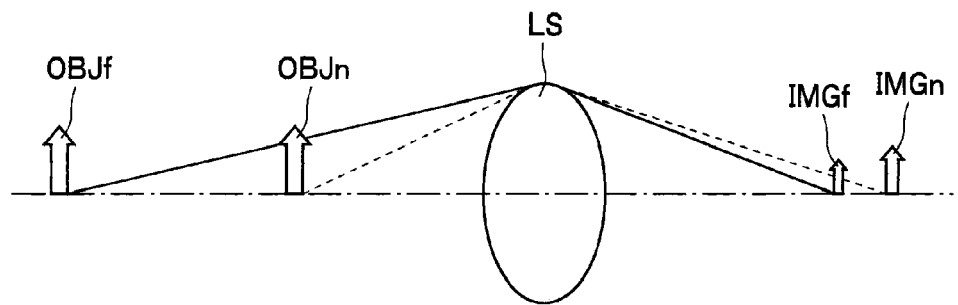
FIG. 1 is a diagram for explaining a difference in a focusing position corresponding to an object distance.

An object image transmitted through the half mirror HM is formed on a first image pickup device ISa. The first image pickup device ISa is, for example, an image pickup device for photoelectrically converting the near distance image IMGn shown in FIG. 1 and generating an image A.

The object image reflected by the half mirror HM is formed on a second image pickup device ISb. The second image pickup device ISb is, for example, an image pickup device for photoelectrically converting the far distance image IMGf shown in FIG. 1 and generating an image B in a focus position different from a focus position of the image A. Therefore, the second image pickup device ISb is arranged in a position with a shorter optical path length from the common optical system LSC than the first image pickup device ISa (an optical path interval is shown in FIG. 5 as d).

In this way, in the present embodiment, the image A functioning as a reference is an image of the near distance object OBJn and the image B is an image of the far distance object OBJf.

Note that, in the example shown in FIG. 5, two image pickup devices are provided. However, the number of image pickup devices is not limited to this. Three or more image pickup devices may be provided to simultaneously acquire three or more images in different focus positions. As explained below as a modification, images in two or more different image forming positions may be simultaneously obtained by a single image pickup device.

The depth expansion apparatus 1 explained above can be widely applied to various apparatuses in an optical field. Several examples of apparatuses to which the depth expansion apparatus 1 is applied are an endoscope, a microscope, a digital camera, and the like. For example, when the depth expansion apparatus 1 is applied to the endoscope, it is conceivable to set the image A as a near point image and set the image B as a far point image.

The configuration shown in FIG. 5 is only an example. In general, the image pickup optical system 2 and the image pickup device 3 in the present embodiment satisfy the following conditional expression (1):

$$R \times NA'/2 \leq d \tag{1}$$

In the expression, NA' represents an image side NA (image side numerical apertures) of the image A (see FIG. 5), R represents lower one of resolution determined by the image pickup optical system 2 and resolution determined by the image pickup device 3 (more specifically, determined by a pixel pitch or the like of the image pickup device 3), and d represents an optical path interface (see FIG. 5) between a surface on which the image A is formed (IMGa in FIG. 5) and a surface on which the image B is formed (IMGb in FIG. 5).

Figure 2:
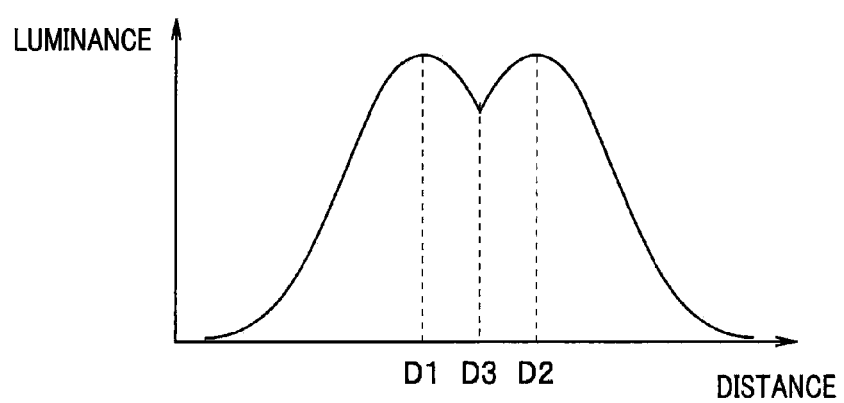
FIG. 2 is a chart showing a state of a luminance change corresponding to an object distance at the time when two images in different focal positions are sliced out and combined according to an object distance.

In order to obtain a depth expanded image, it is desirable to set a minimum value of the optical path interval "d" between the image A and the image B to be equal to or larger than a value corresponding to 0.5 times of a depth of focus. This is because, when the optical path interval "d" is smaller than the value corresponding to 0.5 times of the depth of focus, a distance D1 and a distance D2 shown in FIG. 2 are close to each other, a change in brightness of the image A and the image B is small, and an effect of depth expansion is not sufficiently obtained. A lower limit value $R \times NA'/2$ in the conditional expression (1) is based on this condition.

The image pickup optical system 2 and the image pickup device 3 in the present embodiment further satisfy the following conditional expression (2):

$$0.05 \leq (NAf/NAn)^2 \leq 0.9 \tag{2}$$

In the expression, NAn represents NA of an image with a close photographing distance of the image A and the image B and NAf represents NA of an image with a far photographing distance.

When $(NAf/NAn)^2$ is smaller than a lower limit value 0.05 of the conditional expression (2), since a change in NA is too large, a looking-unnatural feeling is caused by a difference in a resolution limit between a portion focused in a near distance and a portion focused in a far distance and an unnatural image is formed. Therefore, the lower limit value 0.05 of the conditional expression (2) is a value for suppressing such unnaturalness.

When $(NAf/NAn)^2$ exceeds an upper limit value 0.9 of the conditional expression (2), there is no resolution change due to a distance and an unnatural image is formed. Therefore, the upper limit value 0.9 of the conditional expression (2) is a value for suppressing such unnaturalness.

The image pickup optical system 2 and the image pickup device 3 in the present embodiment desirably further satisfy the following conditional expression (3).

The optical path interval "d" between the image A and the image B shown in the conditional expression (1) is desirably equal to or smaller than an upper limit value, which is a value corresponding to maximum visibility 0.5 (1/m) of fluctuations of accommodation (see a second embodiment explained below) for measuring a difference in focus with human eyes. This is because, if the optical path interval "d" is set larger than the value corresponding to the visibility 0.5 (1/m), a difference between blurs of the image A and the image B is too large, blurring exceeding a range correctable by human eyes occurs, and the image A and the image B are seen as unnatural image.

A condition for setting the optical path interval "d" to be equal to or smaller than the value corresponding to 0.5 (1/m)=1/2 (1/m)=1/2000 (1/mm) is represented by the following conditional expression (3) with a focal distance of the image pickup optical system 2 represented as f:

$$d \leq f^2/2000 \quad (3)$$

In this way, the image pickup optical system 2 and the image pickup device 3 are configured to satisfy the lower limit value of the conditional expression (1). This makes it possible to suppress a depth expansion effect from becoming too small. Further, the image pickup optical system 2 and the image pickup device 3 are configured to satisfy an upper limit value of the conditional expression (3). This makes it possible to suppress a depth expansion width obtained by the image A and the image B to be equal to or smaller than an amplitude maximum value of fluctuations of accommodation used for depth expansion during visual observation and prevent an unnatural appearance and an increase in fatigue.

Examples 1 to 3 of the image pickup optical system 2 and the image pickup device 3 satisfying the conditional expressions (1), (2), and (3) are described below. Note that WD represents work distance.

EXAMPLE 1

| | | | | | | |
|---|---|---|---|---|---|---|
| Focal distance | | | | | 0.9852 | |
| Front side focal position | | | | | 0.69635 | |
| R | | | | | 0.0024 | |

| WD | NA | NA' | Near point | Far point | Visibility | (NAf/NAn)² |
|---|---|---|---|---|---|---|
| 4.83 | 0.0176 | 0.10215 | 3.7 | 6.94 | 180.9513 | |
| 9.69 | 0.00975 | 0.10239 | 6.32 | 19 | 96.28021 | 0.3068908 |
| 15.4 | 0.00633 | 0.10248 | 8.64 | 57.49 | 62.12589 | 0.1293547 |
| 21.8 | 0.00456 | 0.10254 | 10.55 | 9999 | 44.45166 | 0.0671281 |

| Focal position | d | R × NA'/2 | Image side depth |
|---|---|---|---|
| 0.175635 | | 0.011747 | 0.093673 |
| 0.093451 | 0.08218333 | 0.01172 | 0.089058 |
| 0.060301 | 0.11534172 | 0.01171 | 0.08728 |
| 0.043146 | 0.132489 | 0.011703 | 0.086208 |

EXAMPLE 2

| | | | | | | |
|---|---|---|---|---|---|---|
| Focal distance | | | | | 1.365 | |
| Front side focal position | | | | | 0.93617 | |
| R | | | | | 0.0028 | |

| WD | NA | NA' | Near point | Far point | Visibility | (NAf/NAn)² |
|---|---|---|---|---|---|---|
| 6.25 | 0.01694 | 0.09325 | 5.02 | 8.11 | 143.9605 | |
| 9.45 | 0.01196 | 0.09339 | 7.14 | 13.61 | 98.55761 | 0.498466 |

| Focal position | d | R × NA'/2 | Image side depth |
|---|---|---|---|
| 0.139731 | | 0.012869 | 0.059579 |
| 0.095662 | 0.044068907 | 0.012849 | 0.056016 |

EXAMPLE 3

| | | | | | | |
|---|---|---|---|---|---|---|
| Focal distance | | | | | 1.457 | |
| Front side focal position | | | | | 0.86 | |
| R | | | | | 0.0024 | |

| WD | NA | NA' | Near point | Far point | Visibility | (NAf/NAn)² |
|---|---|---|---|---|---|---|
| 4.65 | 0.02205 | 0.08646 | 3.85 | 5.77 | 181.4882 | |
| 6.84 | 0.01609 | 0.08654 | 5.41 | 9.11 | 129.8701 | 0.5324697 |
| 11.4 | 0.0103 | 0.08663 | 8.22 | 18 | 81.56607 | 0.2182013 |
| 16 | 0.00755 | 0.08665 | 10.58 | 31.15 | 59.31198 | 0.1172402 |

| Focal position | d | R × NA'/2 | Image side depth |
|---|---|---|---|
| 0.385272 | | 0.013879 | 0.093673 |
| 0.275695 | 0.109577375 | 0.013866 | 0.089058 |
| 0.173152 | 0.212119604 | 0.013852 | 0.08728 |
| 0.12591 | 0.259361671 | 0.013849 | 0.086208 |

The depth expansion apparatus 1 further includes a depth-expanded-image forming section configured to generate or display, on the basis of a luminance change for each of corresponding pixels in the image A and the image B, a depth expanded image that maintains a relation between a distance from an object point to the image pickup optical system 2 and the luminance change.

In particular, the depth expanded image forming section in the present embodiment includes, as shown in FIG. 4, a depth-expanded-image generating section 5 configured to calculate a difference image obtained by subtracting the image B from the image A, add an additional value which increases a maximum luminance value of the difference image to a maximum value that a pixel value can take to pixel values of respective pixels of the difference image and then divide the pixel values by the maximum value to thereby create a standardized image C and further divide the pixel values of the respective pixels of the image A by pixel values of corresponding pixels in the standardized image C to thereby generate a depth expanded image. For example, the depth-expanded-image generating section 5 is provided in an image processing section 4 for processing an image outputted from the image pickup device 3 (however, the depth-expanded-image generating section 5 is not limited to this configuration and may be provided independently from the image processing section 4).

Generation of a depth expanded image by the depth-expanded-image generating section 5 is explained.

Figure 6:
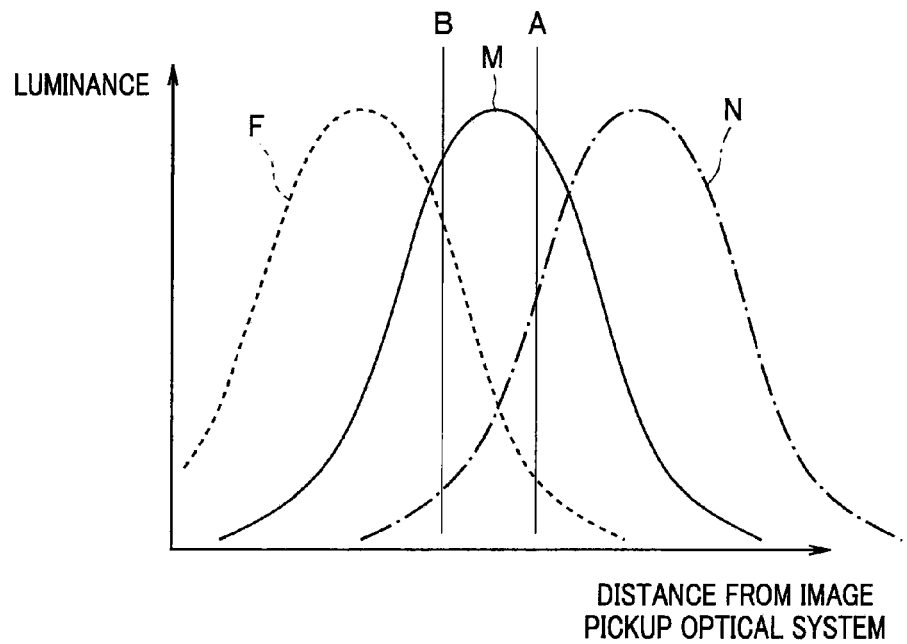
FIG. 6 is a chart showing states of luminance changes corresponding to image side distances from the image pickup optical system of images of near distance, medium distance, and far distance objects together with forming positions of images A and B in the first embodiment.
Figure 7:
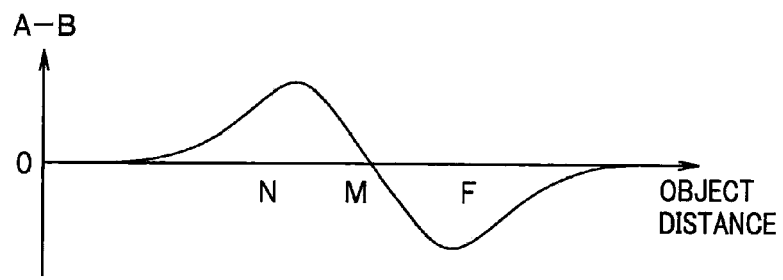
FIG. 7 is a chart showing a change corresponding to an object distance of a value obtained by subtracting a luminance value of the image B from a luminance value of the image A in the first embodiment.

FIG. 6 is a chart showing states of luminance changes corresponding to image side distances from the image pickup optical system of images of near distance, medium distance, and far distance objects together with forming positions of images A and B. FIG. 7 is a chart showing a change corresponding to an object distance of a value obtained by subtracting a luminance value of the image B from a luminance value of the image A.

First, as indicated by respective luminance curves of a solid line, an alternate long and short dash line, and a dotted line in FIG. 6, a luminance value of an object takes a peak value when an image surface coincides with a focusing surface and falls from the peak value according to a separation amount irrespective of whether the image surface comes close to the image pickup optical system 2 from the focusing position or separates from the image pickup optical system 2.

When the focusing surface of the object is located in a middle between an image surface of the image A (a forming surface IMGa of the image A, hereinafter referred to as image surface A as appropriate) and an image surface of the image B (a forming surface IMGb of the image B, hereinafter referred to as image surface B as appropriate) (when the object is an intermediate distance object M), as indicated by the solid line in FIG. 6, a peak of the luminance curve is located in the middle of the image surface A and the image surface B. Luminance obtained in the image A and luminance obtained in the image B are substantially the same level.

On the other hand, when the object is a near distance object N, as indicated by the alternate long and short dash line in FIG. 6, the image surface A is closer to the peak of the luminance curve than the image surface B. Luminance obtained in the image A is higher than luminance obtained in the image B.

When the object is a far distance object F, as indicated by the dotted line in FIG. 6, the image surface B is closer to the peak of the luminance curve than the image surface A. Luminance obtained in the image A is lower than luminance obtained in the image B.

Therefore, how a value A-B obtained by subtracting a luminance value of the image B from a luminance value of the image A changes according to an object distance is illustrated as shown in FIG. 7.

That is, when the object distance changes from an immediately preceding position of the image pickup optical system 2 to infinity, first, the value A-B increases first 0 or positive value, after passing a maximum value, which is a positive value, changes to reduction, after reaching 0 in a position where substantially a middle between the image surface A and the image surface B is a focusing surface, further decreases to take a minimum value, which a negative value, and thereafter gently increases to 0.

Figure 8:
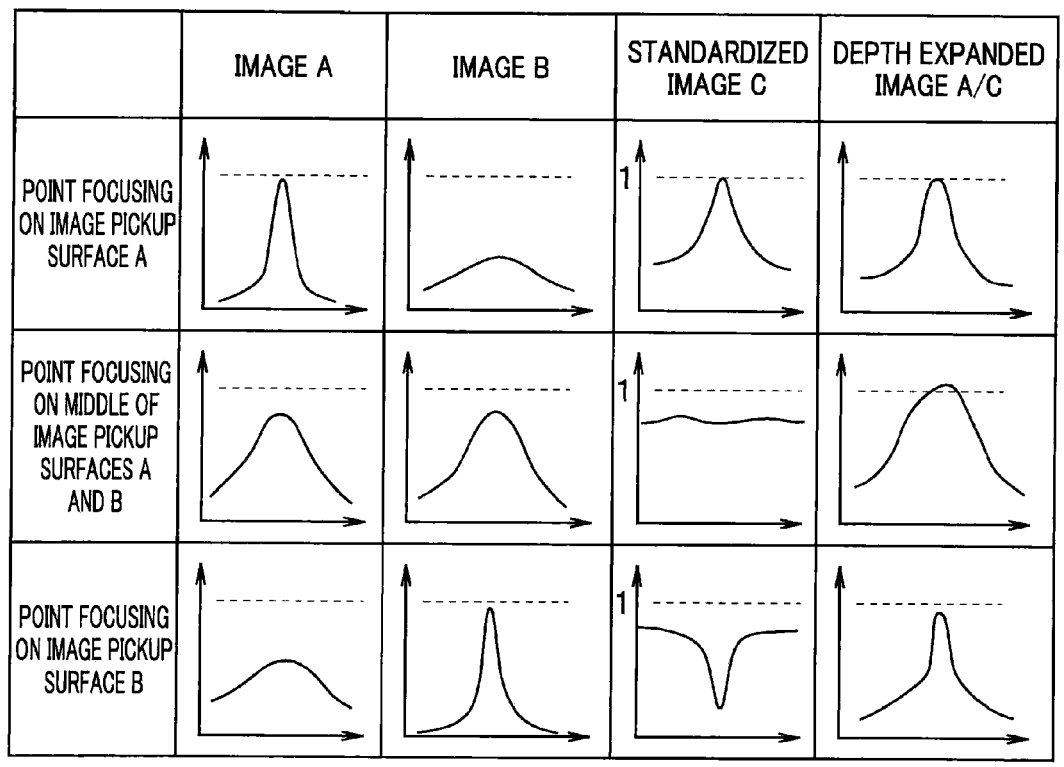
FIG. 8 is a diagram showing examples of the images A and B, a standardized image C, and a depth expanded image corresponding to a positional relation between a focusing surface of an object image and image pickup surfaces A and B in the first embodiment.
Figure 9:
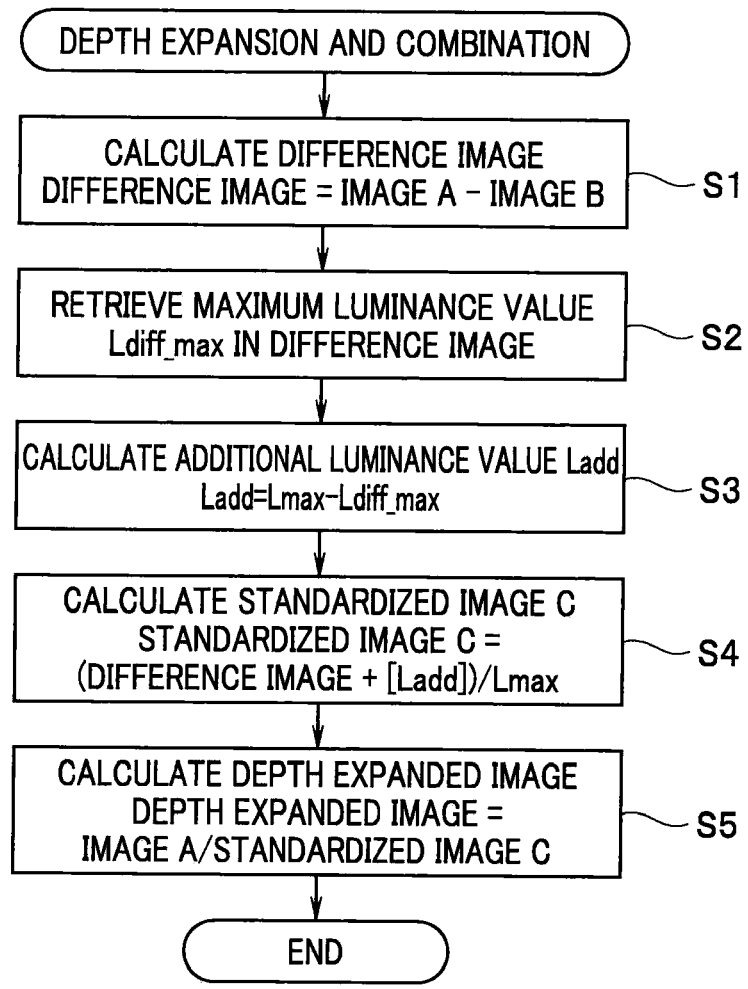
FIG. 9 is a flowchart for explaining processing of depth expansion and combination performed by a depth-expanded-image generating section in the first embodiment.

The depth-expanded-image generating section 5 is configured to generate a depth expanded image from the image A and the image B on the basis of such a relation between the object distance and the luminance. The generation of the depth expanded image by the depth-expanded-image generating section 5 is explained with reference to FIGS. 8 and 9. FIG. 8 is a diagram showing examples of the images A and B, a standardized image C, and a depth expanded image corresponding to a positional relation between a focusing surface of an object image and image pickup surfaces A and B. FIG. 9 is a flowchart for explaining processing of depth expansion and combination performed by the depth-expanded-image generating section 5.

Upon starting the processing of the depth expansion and combination, first, the depth-expanded-image generating section 5 subtracts the image B from the reference image A to calculate a difference image (step S1).

difference image=image $A$-image $B$

The depth-expanded-image generating section 5 performs this subtraction for each of pixels in the same pixel position.

Subsequently, the depth-expanded-image generating section 5 retrieves a pixel having a maximum luminance value $L_{diff\_max}$ out of all pixels in the difference image (step S2).

Incidentally, an image has a maximum luminance value $L_{max}$ that the image can take according to by how many bits a pixel value is represented. As an example, when the pixel value is represented by 10 bits, since a luminance value L takes a value 0 to 1023, the maximum luminance value $L_{max}$ is 1023. The depth-expanded-image generating section 5 calculates an additional luminance value $L_{add}$ as described below using the maximum luminance value $L_{max}$ and the maximum luminance value $L_{diff\_max}$ retrieved in step S2 (step S3).

$L_{add}=L_{max}-L_{diff\_max}$

As a specific example, when the maximum luminance value $L_{diff\_max}$ of the difference image is 50, the additional luminance value $L_{add}$ is 1023−50=973. The additional luminance value $L_{add}$ is an additional value that, when added to the difference image, increases the maximum luminance value $L_{diff\_max}$ of the difference image to a maximum value (the maximum luminance value $L_{max}$) that the pixel value can take.

The depth-expanded-image generating section 5 adds the additional luminance value $L_{add}$ to all pixels of the difference image and then divides the difference image added with the additional luminance value $L_{add}$ by the maximum luminance value $L_{max}$ to thereby create a standardized image C (step S4).

$C$=(difference image+$[L_{add}]$)/$L_{max}$

The standardized image C of an image standardized to have a maximum pixel value 1 and formed by pixel values 0 to 1. $[L_{add}]$ indicates an additional image, pixel values of all pixels of which are the additional luminance value $L_{add}$. The addition of the difference image and the additional image is performed for each of the pixels in the same pixel position as explained above. Therefore, the additional luminance value $L_{add}$ is a global value applied to all the pixels.

Thereafter, the depth-expanded-image generating section 5 divides the image A by the standardized image C to thereby calculate a depth expanded image (step S5).

Depth expanded image=image $A$/standardized image $C$

The depth-expanded-image generating section 5 performs this division for each of the pixels in the same pixel position. The image calculated in this way is the depth expanded image.

When the depth expanded image is calculated, the depth-expanded-image generating section 5 ends the processing of the depth expansion and combination.

The depth expanded image generated by the processing of the depth expansion and combination is displayed, for example, on a display section 6 shown in FIG. 4 provided in the depth expansion apparatus 1. The display section 6 not only displays the generated depth expanded image but also may, as other optional displays, for example, display the image A and the image B side by side, display one of the image A and the image B to be switchable as desired, display the image A and the image B to be superimposed one on top of the other, and display the image A and the image B while switching the images frame by frame at a high frame rate (seen as if a depth of field is expanded through an afterimage phenomenon of eyes).

Next, several examples indicating how the depth expanded image calculated by the processing of the depth expansion and combination changes according to an object distance are explained with reference to FIG. 8. Note that, in respective graphs shown in FIG. 8, a vertical axis indicates a luminance value (a contrast value) and a horizontal axis indicates a space position (a pixel position) on an image.

As shown in FIG. 8, at a point having the image pickup surface A as a focusing surface, a contrast is clear in the image A and a sharp peak occurs at a luminance value. On the other hand, the image A is a blurred image on the image pickup surface B. Therefore, a contrast is unclear and a peak of the luminance value is gentle. A difference image obtained by subtracting the image B from such an image A is an image forming a mountain shape having a peak in the same position as the luminance value peak of the image A. If the peak gives, for example, the maximum luminance value $L_{diff\_max}$ in the difference image, the standardized image C obtained from the difference image is an image forming a mountain shape having a peak of the pixel value 1 in the same position as the luminance value peak of the image A. When the image A is divided by the standardized image C to calculate a depth expanded image, a peak of the standardized image C is the pixel value 1. Therefore, a value of a luminance value peak of the image A does not change and a pixel value other than the peak of the standardized image C is smaller than 1. Therefore, pixel values of pixels other than a pixel corresponding to the luminance value peak of the image A increase according to the division. An image shown in the figure, inclination on both side of a peak of which is gentler than inclination in the image A, is obtained.

At a point having the middle between the image pickup surface A and the image pickup surface B as a focusing surface, a certain degree of a contrast is obtained on both of the image A and the image pickup surface B. However, the image A is an image, a peak of a luminance value of which is somewhat gentle. Although there is a difference concerning whether a focal point of a lens is in front or behind an object, the image A is a relatively approximate blurred image. Therefore, respective pixel values of the difference image are close to zero (i.e., far smaller than the maximum luminance value $L_{diff\_max}$ explained above). The standardized image C is an image having a pixel value close to ($L_{add}/L_{max}$). Therefore, when the image A is divided by the standardized image C, pixel values of respective pixels are amplified about ($L_{max}/L_{add}$) times. An image obtained by a depth expanded image is an image having a shape approximate to the image A but amplified larger than the image A.

Further, at a point having the image pickup surface B as a focusing surface, since the image A is a blurred image on the image pickup surface A, a contrast is unclear and a peak of a luminance value is gentle. On the other hand, in the image B, a contrast is clear and a sharp peak occurs in a luminance value. When a standardized image C is calculated on the basis of the image A and the image B, an image having a bottom of a trough of a luminance value in the same position as the luminance value peak of the image B is obtained. When the image A is divided by the standardized image C to calculate a depth expanded image, in the depth expanded image, a peak of a luminance value occurs in the same position as the luminance value peak of the image B according to the bottom of the standardized image C. In pixels other than the bottom of the standardized image C, pixel values of the pixels increases through the division except pixels, pixel values of which are 1, in the standardized image C. An image shown in the figure is obtained in which inclination on both sides of the peak is slightly steeper than inclination in the image A (however, the inclination on both the side of the peak is slightly gentler than inclination in the image B).

Figure 3:
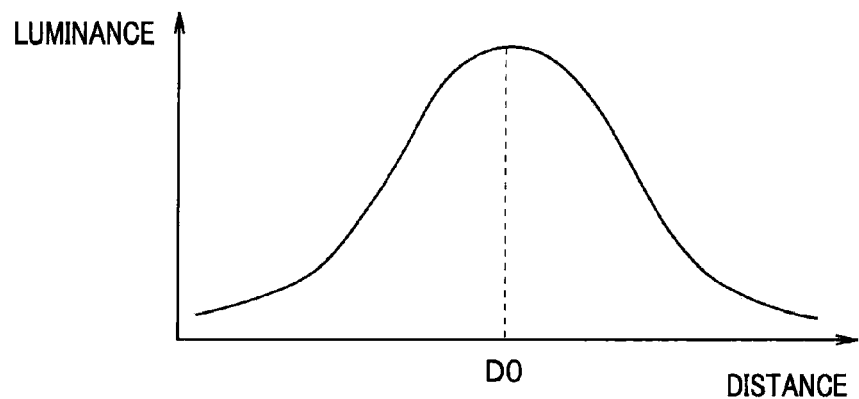
FIG. 3 is a chart showing a state of a luminance change of a point light source corresponding to a change in an object distance at the time when a distance D0 is set as a focusing position.

Therefore, irrespective of in which of the image A and the image B a sharp peak of a luminance value is present, the combined depth expanded image can generally maintain the luminance value peak while making inclination slightly gentle. On the other hand, at a point having a middle between the image pickup surface A and the image pickup surface B as a focusing surface, pixel values are amplified as explained above while a peak shape is generally maintained. Therefore, it is possible to obtain a higher peak value. As a result of such processing, a contrast of a depth expanded image changes from a twin peak shape shown in FIG. 2 to be close to the mountain shape having the single peak shown in FIG. 3. Since such processing is performed for an entire image, even if objects at various object distances are present within a photographing angle of view and positional relations between focusing surfaces of the respective objects and the image pickup surfaces A and B are various, it is possible to improve a contrast of the entire image and realize depth expansion.

In this way, by performing the processing of the depth expansion and combination explained with reference to FIG. 9, brightness of an image is also reflected as distance information, a depth expanded image reflecting a brightness change due to a distance within depth is created, and an image natural in appearance for an observer is obtained.

Note that the depth-expanded-image generating section 5 does not set only two images obtained from the image pickup device 3 as combination targets in the depth expanded image generation.

For example, when three images in different focus positions are acquired from the image pickup device 3, the depth-expanded-image generating section 5 may generate a depth expanded image from a first image and a second image and combine the generated depth expanded image and a third image to generate a further depth expanded image.

For example, when four images in different focus positions are acquired from the image pickup device 3, the depth-expanded-image generating section 5 may generate a first depth expanded image from the first image and the second image, generate a second depth expanded image from a third image and a fourth image, and combine the generated first and second depth expanded images to generate a further depth expanded image.

In such a case, depths of focus of two images to be combined in the depth expanded image generation could be different. When images, depths of focus of which are too different, are combined, however, a further depth expanded image after the combination is sometimes observed unnaturally. In the two images to be combined, a ratio RFD of a depth of focus of one image and a depth of focus of the other image desirably satisfies the following condition:

$$0.7 \leq RFD \leq (1/0.7)$$

Figure 10:
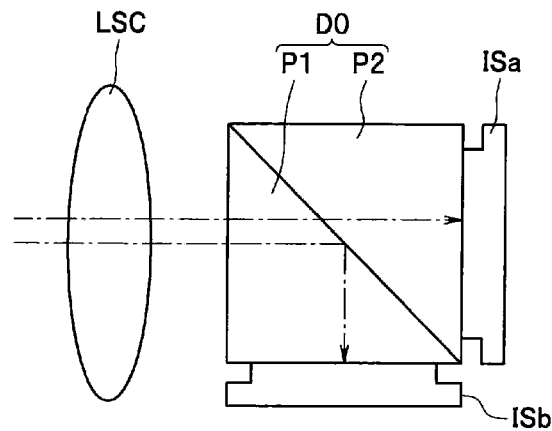
FIG. 10 is a diagram showing a configuration of a splitting optical device in a first modification of the first embodiment.

Next, FIG. 10 is a diagram showing a configuration of a splitting optical device in a first modification.

In the configuration shown in FIG. 5, the half mirror HM is used as the splitting optical device. However, in the configuration shown in FIG. 10, a prism optical system configured by joining a first prism P1 and a second prism P2 is used as a splitting optical device DO. That is, in the splitting optical device DO, a joined surface of the first prism P1 and the second prism P2 is an optical surface that simultaneously performs light transmitting action and light reflecting action to thereby split light made incident from the common optical system LSC into two and emitting the split lights in spatially different directions.

A first image pickup device ISa and a second image pickup device ISb are respectively, for example, bonded to the second prism P2 and the first prism P1. The splitting optical device DO and the first image pickup device ISa and the second image pickup device ISb are integrated as an image pickup unit.

In such a configuration, the first image pickup device ISa is positioned in a near point position and the second image pickup device ISb is positioned in a far point position by, for example, controlling a bonding thickness. In the positioning, for example, first, the splitting optical device DO is moved along an optical axis to perform position adjustment in a Z direction (i.e., focusing) and, thereafter, XY position adjustments for the first image pickup device ISa and the second image pickup device ISb are respectively performed on a prism surface.

Figure 11:
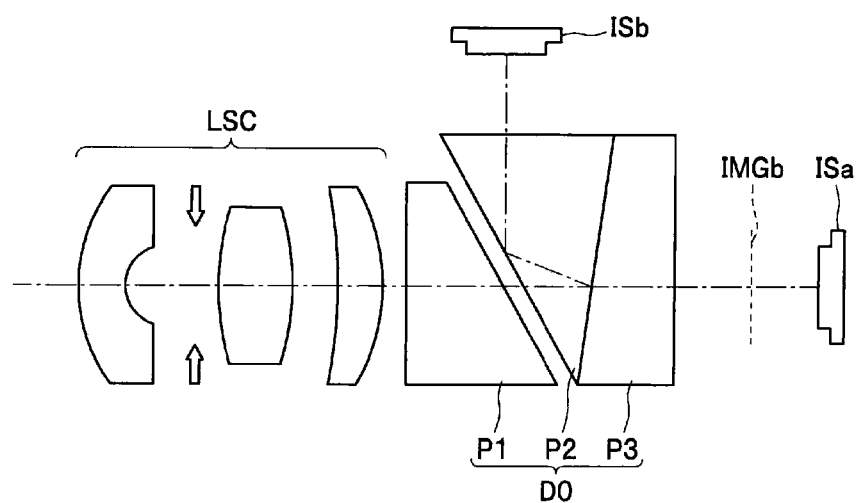
FIG. 11 is a diagram showing a configuration of a splitting optical device in a second modification of the first embodiment.

FIG. 11 is a diagram showing a configuration of a splitting optical device in a second modification.

In the second modification, as in the first modification, a prism optical system is used as the splitting optical device DO. However, the splitting optical device DO is further configured to emit light to one of the two image pickup devices without reflecting the light and emit the light to the other by reflecting the light twice.

That is, the splitting optical device DO includes the first prism P1, the second prism P2, and a third prism P3. An air gap set to be a very small space is provided between the first prism P1 and the second prism P2. The second prism P2 and the third prism P3 are joined to be formed as an optical surface that simultaneously performs light transmitting action and light reflecting action to thereby split light made incident from the common optical system LSC into two and emit the light in spatially different directions. Further, an incident surface of the first prism P1 and an emission surface of the third prism P3 are, for example, configured to be parallel.

Light made incident from the common optical system LSC passes through the first prism P1 and is made incident on the second prism P2 via the air gap. The light made incident on the second prism P2 is divided into two by a joined surface of the second prism P2 and the third prism P3. The transmitted light is made incident on the first image pickup device ISa via the third prism P3. The light reflected by the joined surface of the second prism P2 and the third prism P3 is further reflected, for example, upward on an inner surface of the incident surface, on which the air gap is provided, emitted from the second prism P2, and made incident on the second image pickup device ISb.

In the configuration shown in FIG. 10, an image formed on the second image pickup device ISb is a mirror-symmetrical image with respect to an image formed on the first image pickup device ISa. Therefore, in generating a depth expanded image, processing for horizontally inverting an image outputted from the second image pickup device ISb needs to be performed.

On the other hand, with the configuration of the second modification, since an image outputted from the second image pickup device ISb is also a normal image, there is an advantage that the horizontal inversion processing is unnecessary.

Figure 12:
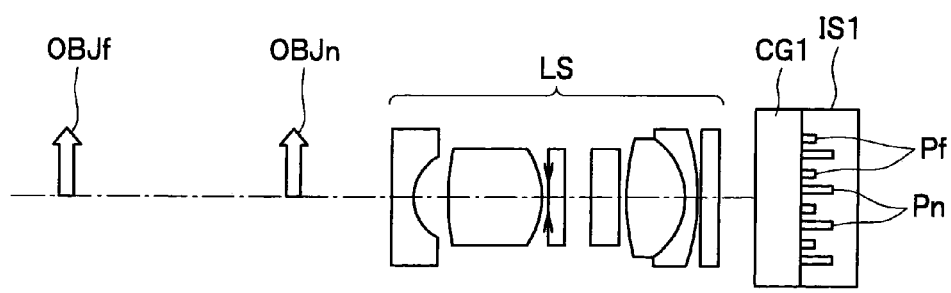
FIG. 12 is a diagram showing a configuration of an image pickup optical system and an image pickup device in a third modification of the first embodiment.
Figure 13:
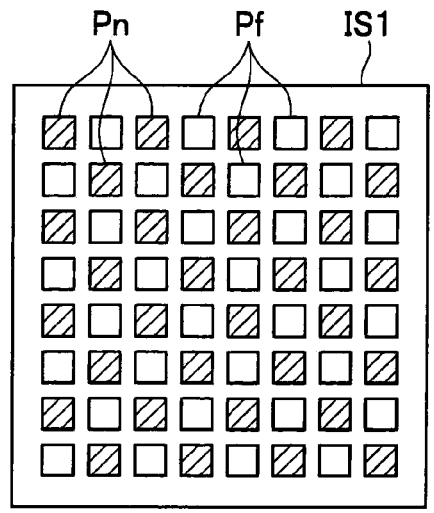
FIG. 13 is a diagram showing an array of pixels for far point and pixels for near point configured on the image pickup device in the third modification of the first embodiment.
Figure 14:
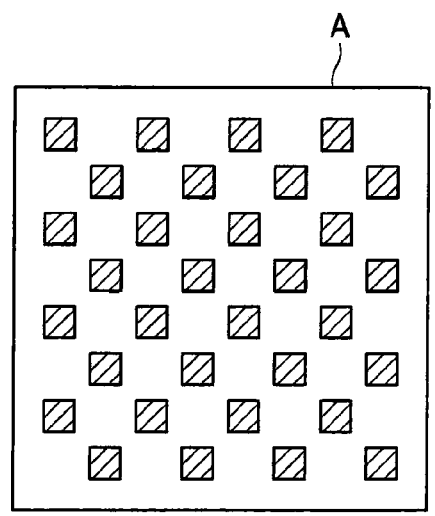
FIG. 14 is a diagram showing a near point image obtained from the pixels for near point in the third modification of the first embodiment.
Figure 15:
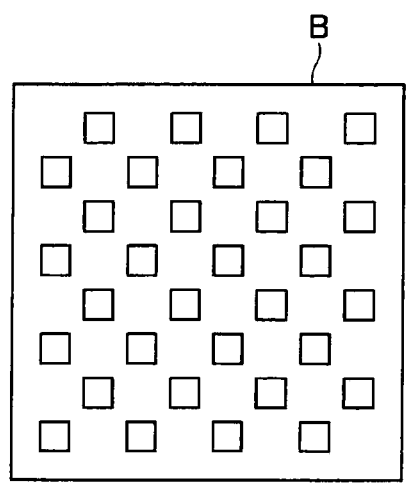
FIG. 15 is a diagram showing a far point image obtained from the pixels for far point in the third modification of the first embodiment.

A third modification is explained with reference to FIGS. 12 to 15. FIG. 12 is a diagram showing a configuration of an image pickup optical system and an image pickup device. FIG. 13 is a diagram showing an array of pixels for far point and pixels for near point configured on the image pickup device. FIG. 14 is a diagram showing a near point image obtained from the pixels for near point. FIG. 15 is a diagram showing a far point image obtained from the pixels for far point.

The third modification is configured to acquire two images in different focus positions in one image pickup by a single image pickup device.

First, the image pickup optical system 2 in the present embodiment is configured by an image pickup optical system LS (corresponding to the image pickup optical system 2 shown in FIG. 4) having the same configuration as the common optical system LSC explained above. The splitting optical device DO is not provided.

An image pickup device IS 1 is disposed on an optical path of a light beam focused by the image pickup optical system LS. For example, a cover glass CG1 is stuck to a front surface side of the image pickup device IS1.

The image pickup device IS 1 is provided with two kinds of pixels having different optical path lengths from the image pickup optical system LS, i.e., pixels for far point Pf for picking up a far point image (an image of a far distance object OBJf present at a far point) and pixels for near point Pn for picking up a near point image (an image of a near distance object OBJn present at a near point).

Position accuracy in arranging the image pickup device IS1 in a focusing position of the image pickup optical system LS is, for example, 10 to 20 μm. An example of an optical path difference between the pixels for near point Pn and the pixels for far point Pf in such a configuration example is 50 μm. However, a size of the optical path difference between the pixels for near point Pn and the pixels for far point Pf is optimized according to configurations and specifications, for example, what kind of an optical system is used as the image pickup optical system LS and an image pickup device having what kind of a size and what kind of a pixel pitch is used as the image pickup device IS1.

Both of the pixels for far point Pf and the pixels for near point Pn are arrayed to be uniformly distributed at the same density over an image pickup surface of the image pickup device IS1. When i=1, 2, . . . and j=1, 2, . . . , for example, as shown in FIG. 13, the pixels for near point Pn are arranged in pixel positions (2i−1, 2j−1) and (2i, 2j) and the pixels for far point Pf are arranged in pixel positions (2i−1, 2j) and (2i, 2j−1).

Therefore, a near point image A obtained from only the pixels for near point Pn is an image formed by pixel values in pixel positions shown in FIG. 14 and a far point image B obtained from only the pixels for far point Pf is an image formed from pixel values in pixels positions shown in FIG. 15. Note that, when formed in this way, in both of the near point image A and the far point image B, a number of pixels of an obtained image is halved compared with a number of pixels of an image obtained using two image pickup devices. However, since an image pickup device in recent years is increased in a number of pixels, it is possible to obtain sufficient image quality in practice.

The near point image A and the far point image B are subjected to demosaicing by interpolation processing or the like in the image processing section 4 and, after all the pixel positions are converted into images corresponding thereto, subjected to processing for generating a depth expanded image with the depth-expanded-image generating section 5.

Note that, in the above explanation, the two kinds of pixels having the different optical path lengths from the image pickup optical system are provided on the one image pickup device. However, three or more kinds of pixels having different optical path lengths may be provided. Further, in general, m (m is a positive integer larger than n) kinds of pixels having different optical path lengths may be provided on n (n is a positive integer) image pickup devices. In this case, it is possible to reduce a number of image pickup devices by m-n compared with m normal image pickup devices arranged in positions having different optical path lengths.

If the configuration of the third modification is adopted, there is an advantage that, even when a single-plate image pickup device is used, it is possible to acquire two or more images in different focus positions at a time and the splitting optical device is unnecessary.

Figure 16:
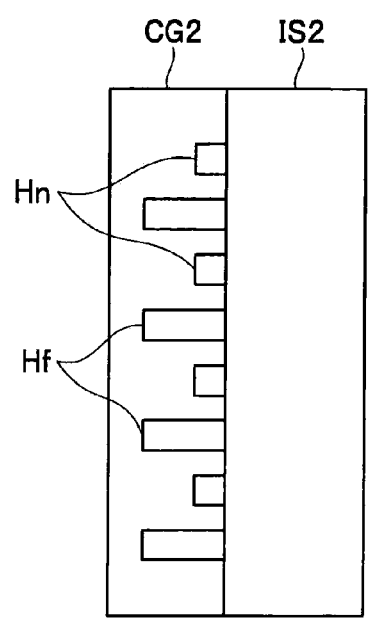
FIG. 16 is a diagram showing a configuration of an image pickup device and a cover glass for optical path correction in a fourth modification of the first embodiment.

FIG. 16 is a diagram showing a configuration of an image pickup device and a cover glass for optical path correction in a fourth modification.

In the third modification explained above, the pixel positions from the image pickup optical system on the image pickup device are varied. In the case of such a configuration, it is necessary to manufacture a dedicated image pickup device in a dedicated manufacturing process. Therefore, manufacturing costs increase.

On the other hand, the fourth modification is contrived to vary pixel positions from the image pickup optical system while using a general-purpose image pickup device.

That is, a cover glass for optical path correction CG2 is stuck to a light receiving surface of a general-purpose image pickup device IS2. The cover glass for optical path correction CG2 has a configuration for varying optical path length of light reaching pixels on the image pickup device IS2. More specifically, the cover glass for optical path correction CG2 includes a structure section for near point Hn for causing light having an optical path length for a near point to reach the pixels and a structure section for far point Hf for causing light having an optical path length for a far point to reach the pixels.

The structure section for near point Hn and the structure section for far point Hf may be configured by forming holes having different air lengths in a cover glass of a flat plate, may be configured by reforming a refractive index of a very small region with laser irradiation, or may adopt other configurations.

When such a configuration is adopted, a pixel group that light passed through the structure section for near point Hn reaches is a pixel group for picking up the image A and a pixel group that light passed through the structure section for far point Hf reaches is a pixel group for picking up the image B.

Types of structure sections for varying an optical path length of light reaching pixels may be three or more types as explained above.

With such a fourth modification, it is possible to attain the same function and realize the same effects as the third modification and use the general-purpose image pickup device IS2. Therefore, there is an advantage that manufacturing costs can be substantially reduced.

With such a first embodiment, a depth expanded image for maintaining a relation between a distance from an object point to the image pickup optical system and a luminance change is generated. Therefore, a natural depth expanded image without a looking-unnatural feeling is obtained.

Since the conditional expression (1) is satisfied, the effect of depth expansion can be sufficiently obtained.

Further, since the conditional expression (2) is satisfied, it is possible to reduce a looking-unnatural feeling caused by a difference between resolution limits of a portion focused in a near distance and a portion focused in a far distance, change resolution according to distances, and obtain a natural image.

The standardized image C is created based on a difference image obtained by subtracting the image B from the image A. The depth expanded image is generated by dividing the image A with the standardized image C. Therefore, it is possible to reflect pixel values corresponding to distances on each of the pixels, reduce a looking-unnatural feeling concerning the distances, and obtain a more natural depth expanded image. Since a calculation is simple, a processing load is light and high-speed processing adaptable to a movie can be performed.

In addition, since the image pickup devices are respectively arranged in a plurality of positions having different optical path lengths from the image pickup optical system, it is possible to simultaneously acquire a plurality of images in different focus positions while dispensing with a mechanism for driving the lens or the image pickup device. Consequently, since an actuator or the like for driving the image pickup device and the lens is unnecessary, it is possible to realize a reduction in size of the image pickup optical system and obtain a configuration suitable for an endoscope requested to be reduced in diameter. Further, since a driving system is not provided, sealing is easy. It is also possible to apply the configuration to a laparoscope for which autoclave is essential. If the image A is set as a near point image and the image B is set as a far point image and the configuration is applied to an endoscope having large depth, there is an advantage that it is possible to obtain a higher depth expansion effect.

When a depth expanded image is generated or displayed on the basis of a plurality of images in different focus positions acquired as explained above, there is an advantage that an image is bright and a contrast is high compared with an image with large depth obtained by restricting an aperture diaphragm.

When the image pickup device is configured to include two pixel groups having different optical path lengths from the image pickup optical system, it is possible to dispense with the splitting optical device and pick up the image A with one pixel group and pick up the image B with the other pixel group without necessity of providing a plurality of image pickup devices. Therefore, it is possible to easily realize a reduction in size of the depth expansion apparatus.

Further, when the splitting optical device is configured to emit light to one image pickup device without reflecting the light and emit the light to the other image pickup device by reflecting the light twice, the horizontal inversion processing in generating a depth expanded image is unnecessary. Therefore, it is possible to reduce a processing load of image processing and reduce a processing time.

Since the telecentric optical system is used as the image pickup optical system 2, even if an optical path length from the image pickup optical system 2 to the first image pickup device and an optical path length from the image pickup optical system 2 to the second image pickup device are different, it is possible to superimpose the image A and the image B in pixel positions corresponding to each other without necessity of performing magnification adjustment. Therefore, it is possible to generate a depth of focus expanded image while reducing a load of the image processing.

When the ratio RFD of depths of focus of two images to be combined is set to be equal to or higher than 0.7 and equal to or lower than (1/0.7), images having depths of focus relatively approximate to each other are combined. Therefore, it is possible to obtain a depth expanded image observed as a natural image.

In addition, when the image pickup optical system 2 and the image pickup device 3 are configured to satisfy the conditional expression (3), a depth expansion width obtained by the image A and the image B is suppressed. Therefore, it is possible to prevent an unnatural appearance and an increase in fatigue.

In this way, it is possible to reproduce a natural contrast change corresponding to an object distance with simple processing.

[Second Embodiment]

Figure 17:
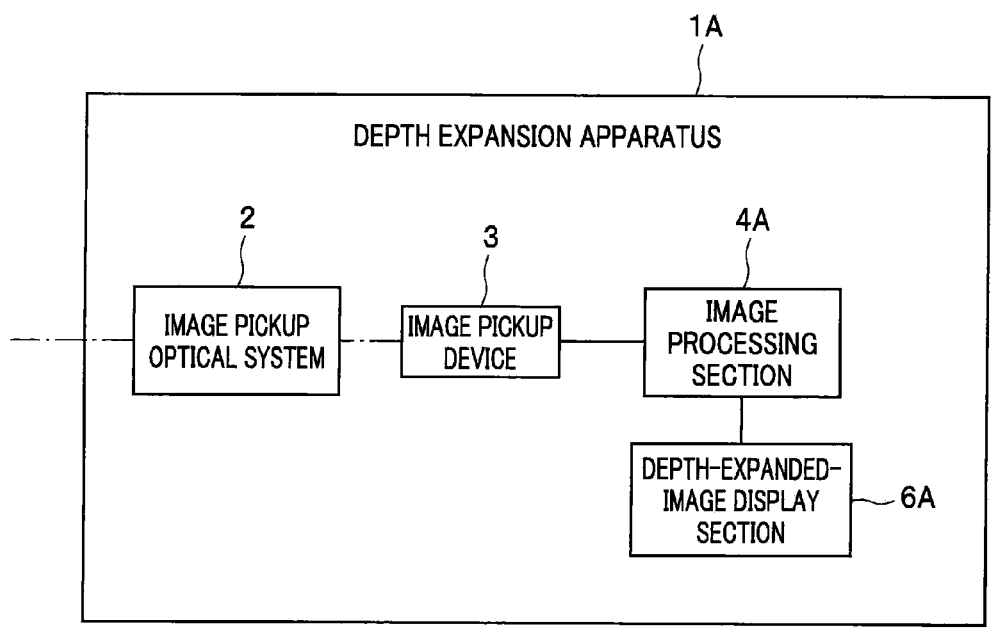
FIG. 17 is a block diagram showing a configuration of a depth expansion apparatus in a second embodiment of the present invention.
Figure 18:
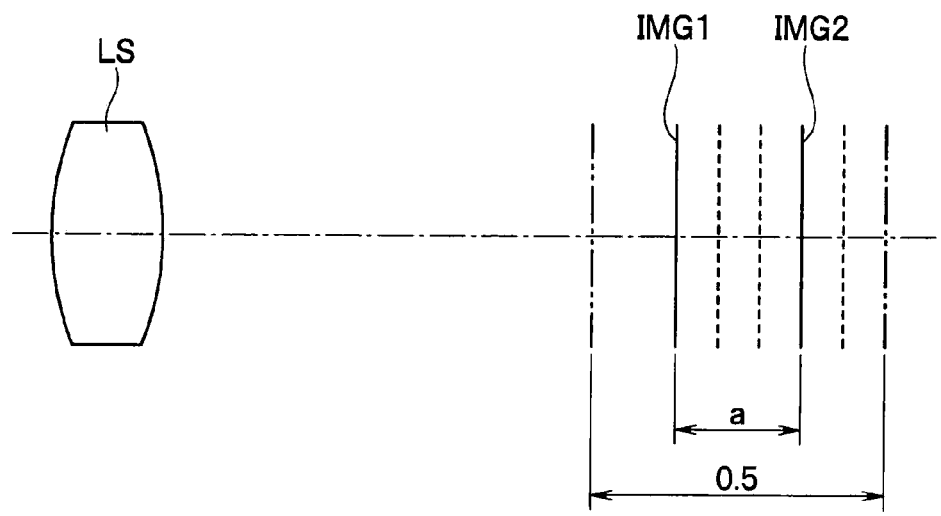
FIG. 18 is a diagram showing a positional relation between an image pickup optical system and an image pickup surface in the depth expansion apparatus in the second embodiment.
Figure 19:
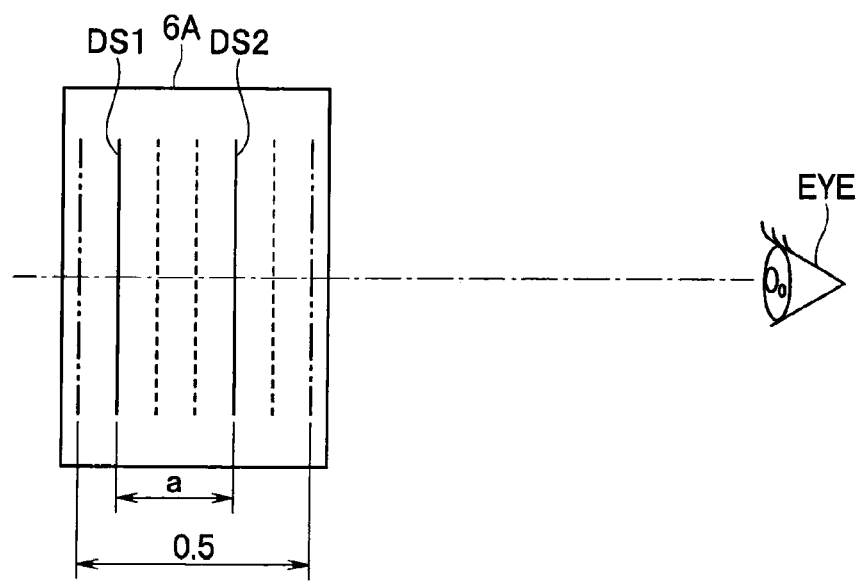
FIG. 19 is a diagram showing a positional relation between a display surface in the depth expansion apparatus in the second embodiment and an eye of an observer.
Figure 20:
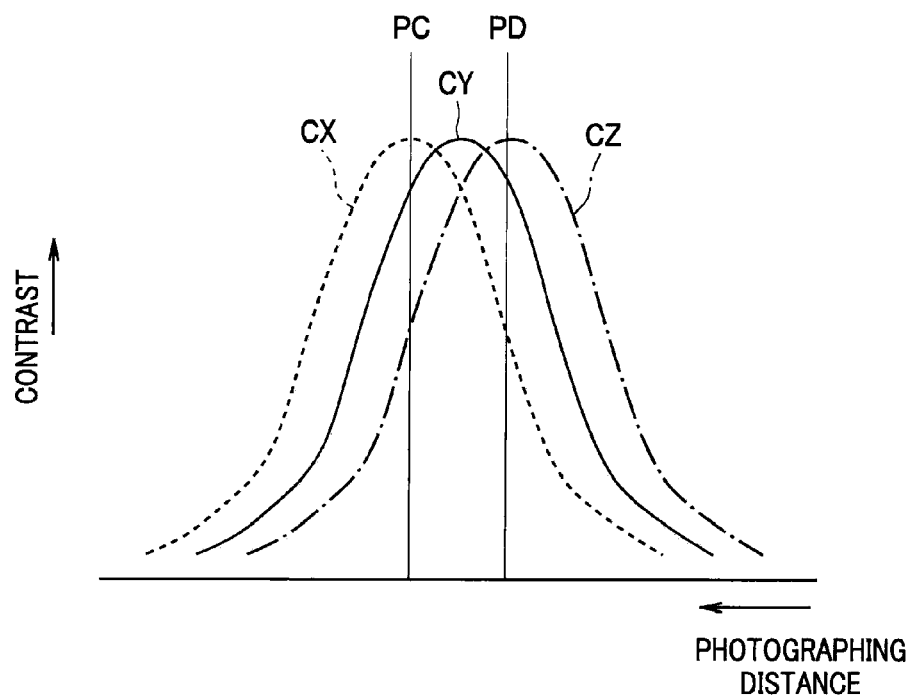
FIG. 20 is a chart showing a relation between contrast changes at three points X, Y, and Z at different photographing distances and two photographing surfaces in the second embodiment.
Figure 21:
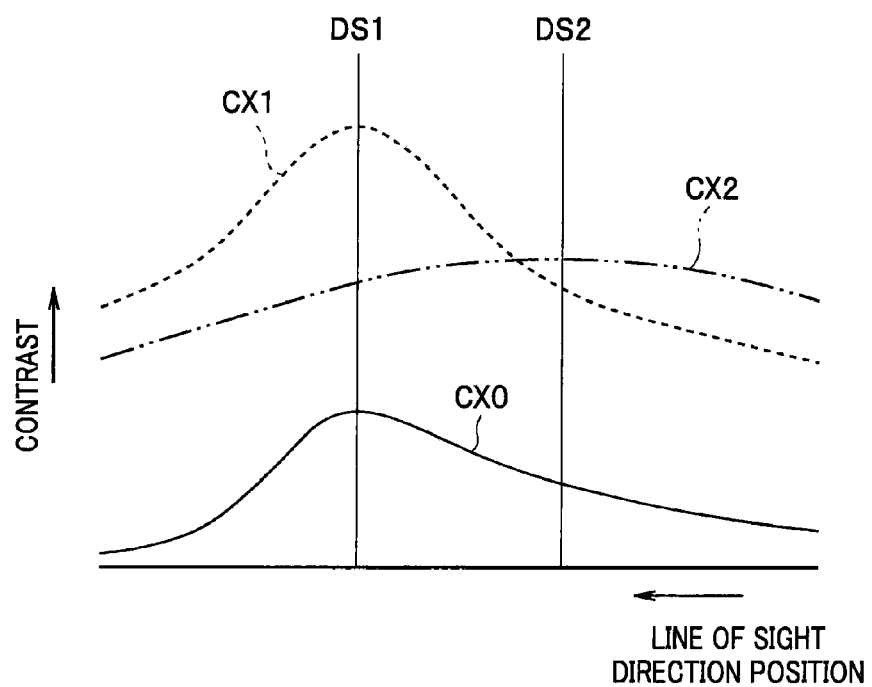
FIG. 21 is a chart showing a state of contrast changes at the time when display of a point X on two display surfaces in different line of sight direction positions is observed in the second embodiment.
Figure 22:
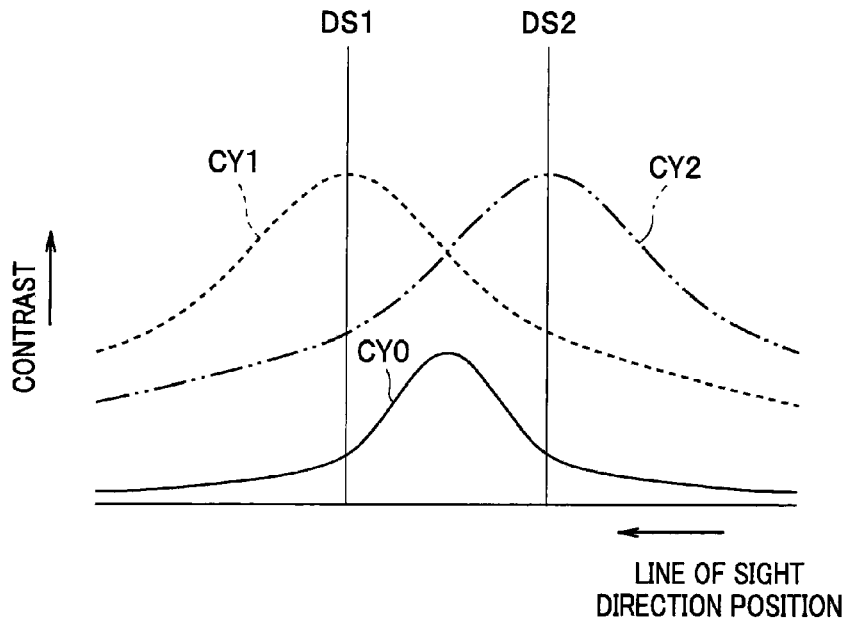
FIG. 22 is a chart showing a state of contrast changes at the time when display of a point Y on the two display surfaces in different line of sight direction positions is observed in the second embodiment.
Figure 23:
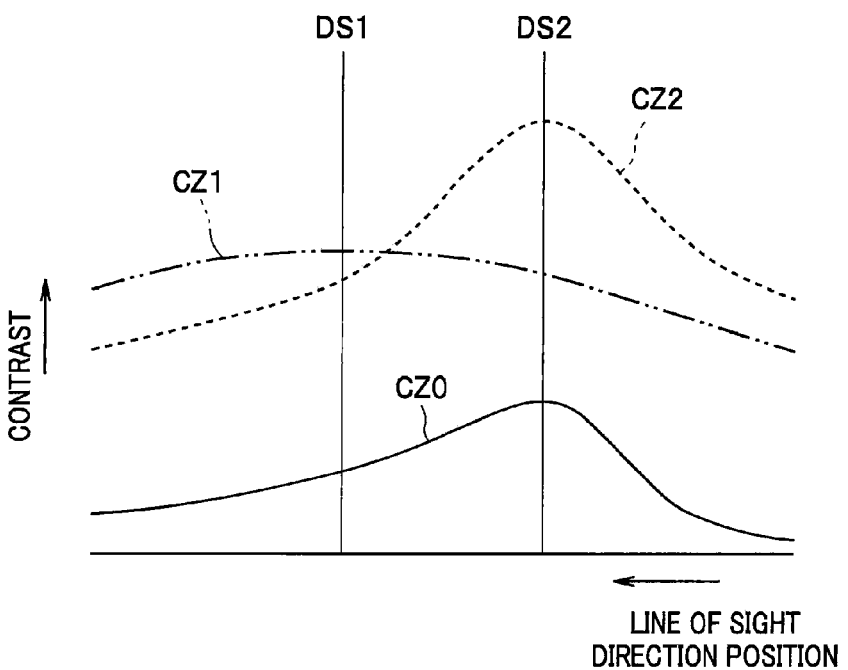
FIG. 23 is a chart showing a state of contrast changes at the time when display of a point Z on the two display surfaces in different line of sight direction positions is observed in the second embodiment.
Figure 24:
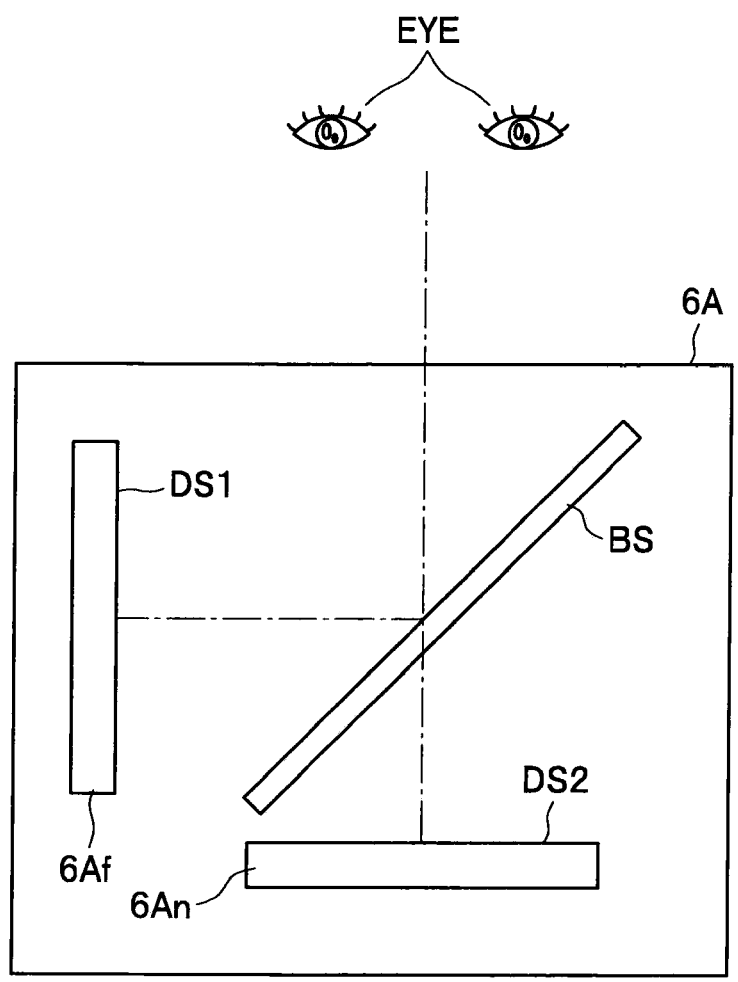
FIG. 24 is a diagram showing a modification of a depth-expanded-image display section in the second embodiment.
Figure 25:
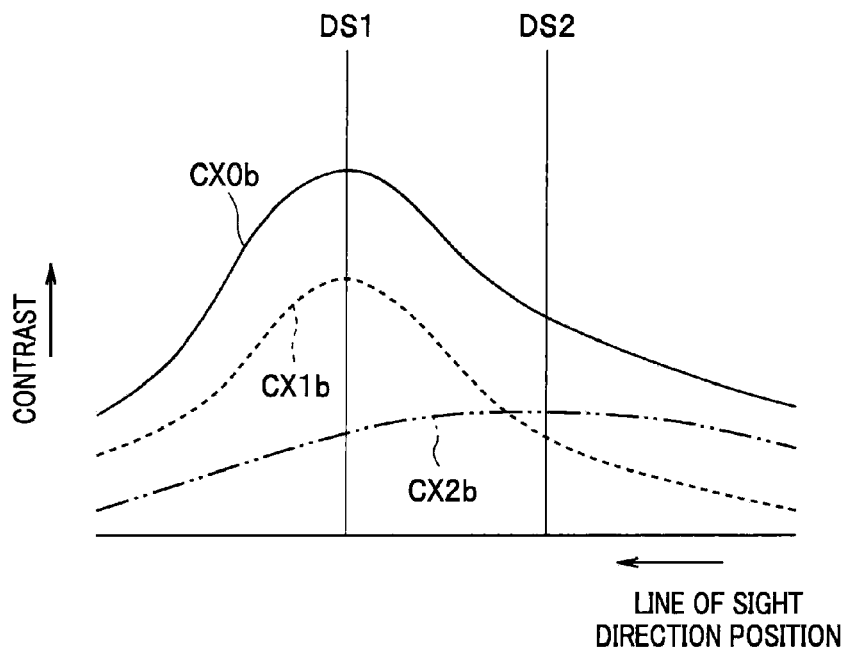
FIG. 25 is a chart showing a state of contrast changes at the time when display of the point X on the two display surfaces in different line of sight direction positions is observed in the modification of the second embodiment.
Figure 26:
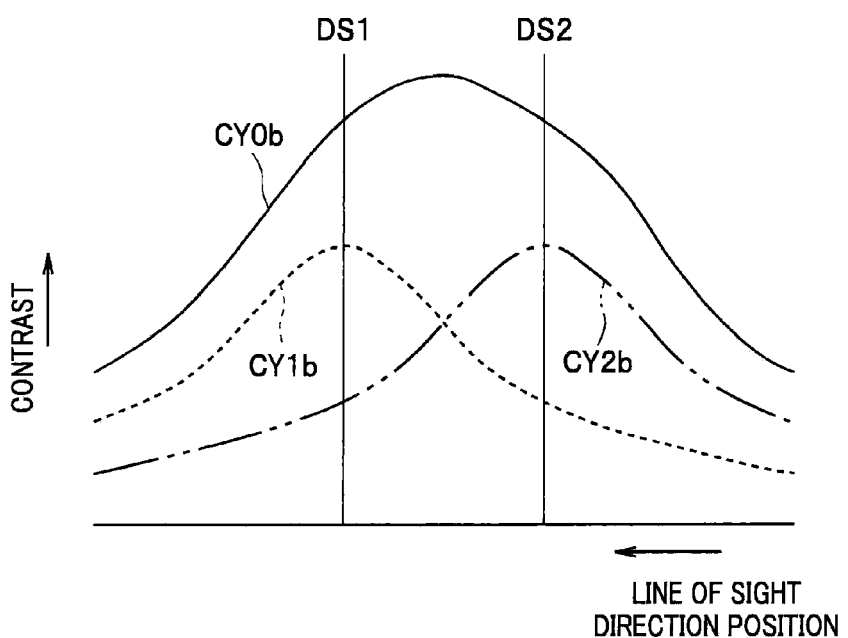
FIG. 26 is a chart showing a state of contrast changes at the time when display of the point Y on the two display surfaces in different line of sight direction positions is observed in the modification of the second embodiment.
Figure 27:
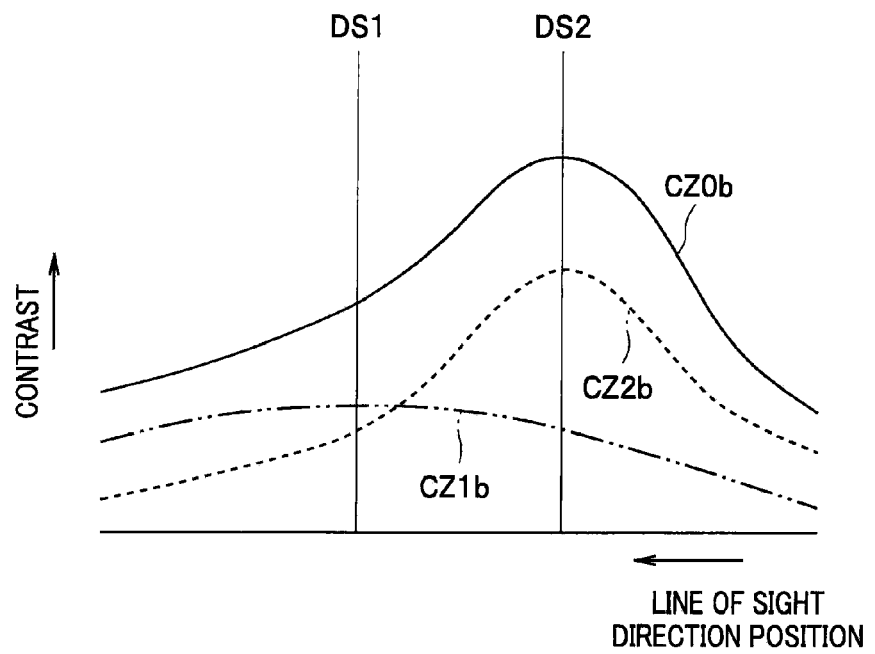
FIG. 27 is a chart showing a state of contrast changes at the time when display of the point Z on the two display surfaces in different line of sight direction positions is observed in the modification of the second embodiment.

FIGS. 17 to 27 are diagrams showing a second embodiment of the present invention. FIG. 17 is a block diagram showing a configuration of a depth expansion apparatus. FIG. 18 is a diagram showing a positional relation between an image pickup optical system and an image pickup surface in the depth expansion apparatus. FIG. 19 is a diagram showing a positional relation between a display surface in the depth expansion apparatus and an eye of an observer. FIG. 20 is a chart showing a relation between contrast changes at three points X, Y, and Z at different photographing distances and two photographing surfaces. FIG. 21 is a chart showing a state of contrast changes at the time when display of a point X on two display surfaces in different line of sight direction positions is observed. FIG. 22 is a chart showing a state of contrast changes at the time when display of a point Y on the two display surfaces in different line of sight direction positions is observed. FIG. 23 is a chart showing a state of contrast changes at the time when display of a point Z on the two display surfaces in different line of sight direction positions is observed. FIG. 24 is a diagram showing a modification of a depth-expanded-image display section. FIG. 25 is a chart showing a state of contrast changes at the time when display of the point X on the two display surface in different line of sight direction positions is observed in a modification. FIG. 26 is a chart showing a state of contrast changes at the time when display of the point Y on the two display surfaces in different line of sight direction positions is observed in the modification. FIG. 27 is a chart showing a state of contrast changes at the time when display of the point Z on the two display surfaces in different line of sight direction positions is observed in the modification. In the second embodiment, explanation of portions same as the portions in the first embodiment is omitted as appropriate by, for example, denoting the portions with the same reference numerals and signs. Only differences are mainly explained.

In the first embodiment, the depth-expanded-image forming section includes the depth-expanded-image generating section 5 configured to generate an image with an expanded depth of focus on the basis of a plurality of images in different focus positions. However, in the second embodiment, the depth-expanded-image forming section includes a depth-expanded-image display section 6A configured to display an image with an expanded depth of focus on the basis of a plurality of images in different focus positions.

First, most of depth of focus expanding techniques in the past are techniques for clearly showing lines and dots projected on a plane (increasing a contrast) and expanding a depth. Therefore, concerning a surface like a film, there is no or little expansion effect of a depth of focus. Conversely, it is sometimes difficult for an observer to recognize a target. To solve this problem, it is conceivable to use a stereoscopic image. However, a method of recognizing corresponding points of dots and lines of a 2D image is used for a stereoscopic image that can be created most easily. Therefore, like depth expanding technique for the 2D image, it is difficult to recognize a surface.

On the other hand, it is also conceivable to use improved stereoscopic display of a DFD type described in Japanese Patent Application Laid-Open publication No. 2005-49646 and Japanese Patent Application Laid-Open Publication No. 2006-208407. However, in such stereoscopic display, a method of efficiently expanding a depth is not clarified.

On the other hand, it is known that human eyes recognize a target at a depth of focus deeper than a value calculated from resolution of the eyes. This is estimated to be because the human eyes perform motion called fluctuations of accommodation. The fluctuations of accommodation mean motion of the eyes for changing a focal position at visibility of 0.3 to 0.5 (1/m) in a period of about 0.5 second. A human is considered to perform the fluctuations of accommodation unconsciously, observe the target in different focal positions, stereoscopically acquire information concerning the target, and recognize the target as a target with an expanded depth.

A principle of depth expansion that makes use of such a function of the human eyes is explained with reference to FIGS. 20 to 23.

A depth recognizing method for recognizing a depth using the fluctuations of accommodation is a method of recognizing a contrast peak in a line of sight direction (an optical axis direction of an eye) as a position. Therefore, it is necessary to form an image, a contrast of which changes in the line of sight direction. To form the image, a plurality of images with varied photographing distances are photographed. However, for easiness of understanding, an example is explained in which two images with different photographing distances, i.e., an image of a photographing surface PC with a near photographing distance and an image of a photographing surface PD with a far photographing distance are photographed. Further, in the explanation, an object to be photographed is the same point light source and a point light source (a point X) is present on the photographing surface PC, a point light source (a point Y) is present in the middle of the photographing surface PC and the photographing surface PD, and a point light source (a point Z) is present on the photographing surface PD.

The photographing surfaces PC and PD and contrast changes at the points X, Y, and Z in such an example are illustrated as shown in FIG. 20. That is, the point X forms a contrast curve CX having a contrast peak on the photographing surface PC, the point Y forms a contrast curve CY having a contrast peak in the middle of the photographing surface PC and the photographing surface PD, and the point Z forms a contrast curve CZ having a contrast peak on the photographing surface PC. In this way, contrast changes of the point X, the point Y, and the point Z are recorded in an image of the photographing surface PC and an image of the photographing surface PD.

The image of the photographing surface PC and the image of the photographing surface PD photographed in such a situation are respectively displayed on a display surface DS1 and a display surface DS2. At this point, at least the display surface DS2 present on the near side in the line of sight direction in the two display surfaces is a display surface of a transmission type, the image of which is seen through the image of DS1. When such a display method is used, contrast changes of display of the point X, the point Y, and the point Z seen by the eye are as explained below. That is, when the image displayed on the display surface DS1 and the image displayed on the display surface DS2 are superimposed and observed, a contrast of the superimposed images viewed from the observer is a product of contrasts of the two images.

More specifically, as shown in FIG. 21, when only the image displayed on the display surface DS1 is observed, the point X has a relatively high and sharp contrast peak on the display surface DS1 (a contrast curve CX1) and, when only the image displayed on the display surface DS2 is observed, the point X has a relatively low and gentle contrast peak near the display surface DS2 (a contrast curve CX2). When the images are superimposed and observed, as indicated by a combined contrast curve CX0, a contrast peak of a displayed image at the point X is on the display surface DS1 (note that, in FIGS. 21 to 23, the combined contrast curve is rendered with an ordinate position shifted from ordinate positions of contrast curves before combination).

As shown in FIG. 22, the point Y has a contrast peak at a certain degree of height on the display surface DS1 when only the image displayed on the display surface DS1 is observed (a contrast curve CY1) and has a contrast peak at the same degree of height on the display surface DS2 when only the image displayed on the display surface DS2 is observed (a contrast curve CY2). When the images are superimposed and observed, as indicated by a combined contrast curve CY0, a contrast peak of a displayed image of the point Y is in the middle of the display surface DS1 and the display surface DS2.

Further, as shown in FIG. 23, the point Z has a relatively low and gentle contrast peak near the display surface DS1 when only the image displayed on the display surface DS1 is observed (a contrast curve CZ1) and has a relatively high and sharp contrast peak on the display surface DS2 when only the image displayed on the display surface DS2 is observed (a contrast curve CZ2). When the images are superimposed and observed, as indicated by a combined contrast curve CZ0, a contrast peak of a displayed image of the point Z is on the display surface DS2.

The observer senses, on the basis of the contrast changes of the image displayed on the display surface DS1 and the image displayed on the display surface DS2, the images as indicated by the combined contrast curves and recognizes a distance of each of pixels of the displayed images. Consequently, it is possible to stereoscopically grasp a shape of an object displayed on the images. In a case shown in FIG. 22, since the observer recognizes that a focus is set between the two displayed images, it is possible to realize natural expansion of a depth.

Note that the fluctuations of accommodation are mainly explained as a function of the human eyes. This is because an amount of a change of a focus is relatively large. However, the function of the human eyes is not limited to this. The same effect can be obtained by a function of expanding and contracting eye axis of the human eye or changing a thickness of retinas.

The depth-expanded-image display section 6A in the present embodiment configured using a principle explained above is explained with reference to FIGS. 17 to 19.

That is, a depth expansion apparatus 1A in the present embodiment includes the image pickup optical system 2, the image pickup device 3, an image processing section 4A, and the depth-expanded-image display section 6A.

The configuration of the image pickup optical system 2 and the image pickup device 3 is substantially the same as the configuration explained in the first embodiment and the modifications of the first embodiment. However, in the first embodiment, the image pickup optical system 2 and the image pickup device 3 indispensably satisfy the conditional expressions (1) and (2) and the conditional expression (3) is optional. On the other hand, the image pickup optical system 2 in the present embodiment does not only indispensably satisfies the conditional expressions (1) and (2) but also has the conditional expression (3) as an indispensable condition.

That is, in the image pickup optical system 2 and the image pickup device 3, a plurality of image pickup surfaces are arranged within range of the fluctuations of accommodation (i.e., within visibility 0.5 (1/m)). In FIG. 18, an example is schematically shown in which image pickup surfaces IMG1 and IMG2 are arranged on an optical path of the image pickup optical system LS (corresponding to the image pickup optical system 2 shown in FIG. 17) with an optical path interval "d" (an optical path interval "d" satisfying the conditional expression (3)) corresponding to a predetermined value "a" (1/m) satisfying a≤0.5 apart from each other. However, the photographing surfaces are not limited to two. As indicated by dotted lines, other image pickup surfaces may be further arranged within a range of visibility 0.5 (1/m).

A plurality of images are picked up by such image pickup surfaces IMG1 and IMG2 or the other image pickup surfaces.

Next, unlike the first embodiment, the image processing section 4A does not include the depth-expanded-image generating section 5. Therefore, the image processing section 4A applies normal various kinds of image processing (various kinds of processing such as amplification, white balance, demosaicing, noise removal, and gamma correction) to a plurality of images in different focus positions obtained by image pickup. However, the image processing is performed to maintain a balance among the plurality of images (e.g., to obtain the same brightness or the same color balance).

The display section in the present embodiment is the depth-expanded-image display section 6A configured to display a plurality of images in different focus positions to be observable as an image with an expanded depth of focus.

The depth-expanded-image display section 6A includes a plurality of display surfaces parallel to one another and having different distances viewed from the observer. A surface interval among the plurality of display surfaces is set to a predetermined interval corresponding to an interval within a range of the fluctuations of accommodation of the human eyes (i.e., within visibility 0.5 (1/m)).

In the specific example shown in FIG. 19, the display surface DS1 corresponding to the image pickup surface IMG1 and the display surface DS2 corresponding to the image pickup surface IMG2 are arranged within the range of visibility 0.5 (1/m). Like the arrangement interval between the image pickup surface IMG1 and the image pickup surface IMG2, an arrangement interval between the display surfaces DS1 and DS2 is an interval corresponding to the predetermined value "a" (1/m) that satisfies a≤0.5 (an interval proportional to a visibility difference of image pickup). Arrangement order of the display surfaces DS1 and DS2 viewed from an eye EYE of the observer is the same as arrangement order at the time when the object having the image pickup surface IMG1 as the focusing surface and the object having the image pickup surface IMG2 as the focusing surface are viewed from the image pickup optical system LS shown in FIG. 18. That is, for example, a far point image is formed on the image pickup surface IMG1 and, for example, a near point image is formed on the image pickup surface IMG2. Therefore, the display surface DS1 corresponding to the image pickup surface IMG1 is present in a distance when viewed from the eye EYE of the observer. The display surface DS2 corresponding to the image pickup surface IMG2 is present in a vicinity when viewed from the eye EYE of the observer.

Note that, when the other image pickup surfaces are further arranged within the range of visibility 0.5 (1/m) as indicated by the dotted line in FIG. 18 to pick up images, display surfaces corresponding to the respective image pickup surfaces are also provided in the depth-expanded-image display section 6A as indicated by dotted lines in FIG. 19. In this case, the observer can more stereoscopically and finely grasp an object. For example, the observer can easily recognize an object formed in a film shape in a state in which a depth of focus is expanded.

When the configuration shown in FIG. 19 is adopted, all the display surfaces are display surfaces of the transmission type except a display surface present in an innermost part viewed from the eye EYE of the observer. The display surface present in the innermost part viewed from the observer may be either the transmission type or a non-transmission type but is preferably the non-transmission type in order to prevent transmission of a background and make it easy to see an image.

When a plurality of images are displayed on the plurality of display surfaces according to such a configuration, the displayed plurality of images are observed as being superimposed from the eye EYE of the observer. The observer who observes the plurality of images in different focus positions of the same object recognizes, as explained above, in order to unconsciously perform the fluctuations of accommodation, the plurality of images as one image with an expanded depth rather than separately recognizing the plurality of images.

Note that, naturally, the depth-expanded-image display section 6A may be the configuration that enables other optional displays as explained concerning the display section 6 in the first embodiment.

In the above explanation, the display device that makes use of the transmission-type liquid crystal display device or the like is assumed as the depth-expanded-image display section 6A. However, the depth-expanded-image display section 6A is not limited to this.

A modification of the depth-expanded-image display section is explained with reference to FIGS. 24 to 27.

The depth-expanded-image display section 6A in this modification is configured to superimpose a plurality of images in different line of sight direction positions making use of a beam splitter BS such as a half mirror.

That is, the depth-expanded-image display section 6A includes an image display section for far point 6Af including the display surface DS 1 corresponding to the image pickup surface IMG1, an image display section for near point 6An including the display surface DS2 corresponding to the image pickup surface IMG2, and the beam splitter BS for superimposing a far point image displayed on the display surface DS 1 and a near point image displayed on the display surface DS2 and leading the superimposed image to the eye EYE of the observer.

When the three points X, Y, and Z having the different photographing distances are observed using the depth-expanded-image display section 6A having the configuration shown in FIG. 24, a contrast change is a sum of an image displayed on the display surface DS1 and an image displayed on the display surface DS2 and is, for example, as shown in FIGS. 25 to 27.

Further, the depth-expanded-image display section 6A is not limited to the display device that makes use of the transmission-type liquid crystal display device or the beam splitter BS explained above and may be a depth-expanded-image photo frame in which display devices that can switch a full transmission state and an image display state at temporally indistinguishable speed are arranged within a range of the fluctuations of accommodation, i.e., in the positions of the display screen DS1 and the display screen DS2 to switch display at high speed. The depth-expanded-image display section 6A may be a depth-expanded-image print or the like configured by sandwiching and laminating transparent plates within the range of the fluctuations of accommodation among a plurality of images printed with dye ink on a transmission film. Therefore, the depth-expanded-image forming section may include a printer for generating a depth expanded image print. Further, a silver halide reversal film can be used instead of an image printed with the dye ink on the transmission film.

According to such a second embodiment, effects substantially the same as the effects in the first embodiment are realized except that images are combined. A plurality of images are displayed with spacing thereamong within the range of the fluctuations of accommodation apart from one another to make it possible to superimpose and observe a plurality of images in different focus positions. Therefore, it is possible to perform stereoscopic reproduction making use of an ability of a human who recognizes an intermediate position of two images in different focus positions. It is possible to display a natural depth expanded image.

The image pickup optical system 2 and the image pickup device 3 are configured to satisfy the conditional expression (3). Therefore, it is possible to suppress a depth expansion width obtained by the image A and the image B to be equal to or smaller than an amplitude maximum value of the fluctuations of accommodation utilized for depth expansion during visual observation and prevent an unnatural appearance and an increase in fatigue.

Note that the present invention is not limited to the embodiments per se. At an implementation stage, it is possible to modify and embody the elements without departing from the spirit of the present invention. Various modes of inventions can be formed by combining the plurality of elements disclosed in the embodiments as appropriate. For example, several elements may be deleted from all the elements described in the embodiments. Moreover, the elements described in the different embodiments may be combined as appropriate. In this way, it goes without saying that various modifications and applications are possible within a range not departing from the spirit of the invention.

What is claimed is:

1. A depth expansion apparatus that can generate or display an image with an expanded depth of focus on the basis of a plurality of images in different focus positions, the depth expansion apparatus comprising:
   an image pickup optical system and an image pickup device configured to form and pick up a reference image (hereinafter referred to as image A) and an image in a focus position different from a focus position of the image A (hereinafter referred to as image B); and
   a depth-expanded-image forming section configured to generate or display, on the basis of a luminance change for each of corresponding pixels in the image A and the image B, a depth expanded image that maintains a relation between a distance from an object point to the image pickup optical system and luminance, wherein
   when an image side NA of the image A is represented as NA', a lower one of resolution determined by the image pickup optical system and resolution determined by the image pickup device is represented as R, an optical path interval between a surface on which the image A is formed and a surface on which the image B is formed is represented as d, NA of an image at a near photographing distance among the image A and the image B is represented as NAn, and NA of an image at a far photographing distance among the image A and the image B is represented as NAf, the image pickup optical system and the image pickup device are configured to satisfy the following conditional expressions (1) and (2):

$$R \times NA'/2 \leq d \quad (1)$$

$$0.05 \leq (NAf/NAn)^2 \leq 0.9 \quad (2).$$

2. The depth expansion apparatus according to claim 1, wherein the depth-expanded-image forming section includes a depth-expanded-image generating section configured to calculate a difference image obtained by subtracting the image B from the image A, add an additional value which increases a maximum luminance value of the difference image to a maximum value that a pixel value can take to pixel values of respective pixels of the difference image and then divide the pixel values by the maximum value to thereby create a standardized image C and further divide the pixel values of the respective pixels of the image A by pixel values of corresponding pixels in the standardized image C to thereby generate a depth expanded image.

3. The depth expansion apparatus according to claim 2, wherein the image pickup optical system is provided in an endoscope, and the image A is a near point image and the image B is a far point image.

4. The depth expansion apparatus according to claim 3, wherein the image pickup device includes two pixel groups having different optical path lengths from the image pickup optical system and picks up the image A with one pixel group and picks up the image B with the other pixel group.

5. The depth expansion apparatus according to claim 3, wherein
   the image pickup device includes a first image pickup device and a second image pickup device, the image pickup optical system includes a splitting optical device configured to split incident light to the first image pickup device and the second image pickup device and emit the split lights, and the splitting optical device emits light to one image pickup device of the first image pickup device and the second image pickup device without reflecting the light and emits light to the other image pickup device by reflecting the light twice.

6. The depth expansion apparatus according to claim 2, wherein the image pickup optical system is a telecentric optical system.

7. The depth expansion apparatus according to claim 2, wherein the depth-expanded-image generating section can combine two images from the image pickup device to generate a depth expanded image and combine one image and one depth expanded image from the image pickup device, which are two images that can have different depths of focus, or two depth expanded images to generate a further depth expanded image, and a ratio RFD of a depth of focus of one image of the two images to be combined and a depth of focus of the other image satisfies the following condition:

$$0.7 \leq RFD \leq (1/0.7).$$

8. The depth expansion apparatus according to claim 1, wherein, when a focal distance of the image pickup optical system is represented as f, the optical path interval d further satisfies the following conditional expression (3):

$$d \leq f^2/2000 \qquad (3).$$

9. The depth expansion apparatus according to claim 8, wherein the depth-expanded-image forming section includes a depth-expanded-image display section that can display a plurality of images to be seen as being superimposed on a plurality of different display surfaces parallel to one another, and the depth-expanded-image display section displays the image A and the image B with a space therebetween in a range within visibility 0.5 to thereby display a depth expanded image.

10. The depth expansion apparatus according to claim 9, wherein the image pickup optical system is provided in an endoscope, the image A is a near point image, and the image B is a far point image.

11. The depth expansion apparatus according to claim 10, wherein the image pickup device includes two pixel groups having different optical path lengths from the image pickup optical system, picks up the image A with one pixel group, and picks up the image B with the other pixel group.

12. The depth expansion apparatus according to claim 10, wherein the image pickup device includes a first image pickup device and a second image pickup device, the image pickup optical system includes a splitting optical device configured to split incident light to the first image pickup device and the second image pickup device and emit the split lights, and the splitting optical device emits light to one image pickup device of the first image pickup device and the second image pickup device without reflecting the light and emits light to the other image pickup device by reflecting the light twice.

13. The depth expansion apparatus according to claim 9, wherein the image pickup optical system is a telecentric optical system.

* * * * *